United States Patent [19]

Chretien

[11] Patent Number: 4,748,298

[45] Date of Patent: May 31, 1988

[54] BISTABLE SWITCH, IN PARTICULAR FOR USE AS A HEADLAMP DIPSWITCH ON A MOTOR VEHICLE

[75] Inventor: Louis J. Chretien, Eragny S/Oise, France

[73] Assignee: Jaeger, Levallois-Perret, France

[21] Appl. No.: 39,093

[22] Filed: Apr. 16, 1987

[30] Foreign Application Priority Data

| Apr. 18, 1986 | [FR] | France | 86 05604 |
| Jun. 3, 1986 | [FR] | France | 86 07963 |
| Dec. 3, 1986 | [FR] | France | 86 16924 |
| Dec. 3, 1986 | [FR] | France | 86 16925 |

[51] Int. Cl.$^4$ .................. H01H 3/16; H01H 83/00
[52] U.S. Cl. .......................... 200/12; 200/4; 200/61.27
[58] Field of Search ............... 200/4, 5 R, 6 R, 6 B, 200/12, 16 C, 16 D, 61.27, 61.54, 153 J, 339

[56] References Cited

U.S. PATENT DOCUMENTS

| 2,924,680 | 2/1960 | Swenson | 200/12 X |
| 3,691,323 | 9/1972 | Anderson et al. | 200/4 |
| 4,129,757 | 12/1978 | Cryer | 200/4 |
| 4,149,048 | 4/1979 | Winter et al. | 200/4 X |
| 4,238,650 | 12/1980 | Cryer et al. | 200/4 |
| 4,300,026 | 11/1981 | Bull | 200/153 J |
| 4,393,280 | 7/1983 | Iwata et al. | 200/4 |

FOREIGN PATENT DOCUMENTS

2354626 6/1978 France .

Primary Examiner—J. R. Scott
Attorney, Agent, or Firm—Fleit, Jacobson, Cohn & Price

[57] ABSTRACT

A bistable switch for use, in particular, as a headlamp dipswitch on a motor vehicle, comprising a housing (100) which receives a control crosshead (200) guided in translation (O) between a rest position and a working position, a toggle bar (300) extending in the direction of crosshead displacement and being pivotally mounted to the crosshead about an axis (302) extending transversely to the direction of crosshead translation, a contact carriage (400) capable of moving in a direction (Q) generally perpendicular to the direction (O) of crosshead displacement and to the pivot axis (302) of the toggle bar (300), the carriage being provided with at least one contact stud (450) and with two camming slopes (460, 470) provided on a common face of the carriage facing the toggle bar (300) in such a manner that the camming slopes (460, 470) are placed alternately opposite the toggle bar (300) depending on the position of the carriage in the housing.

35 Claims, 17 Drawing Sheets

FIG_1

FIG_3

FIG_17

FIG_18

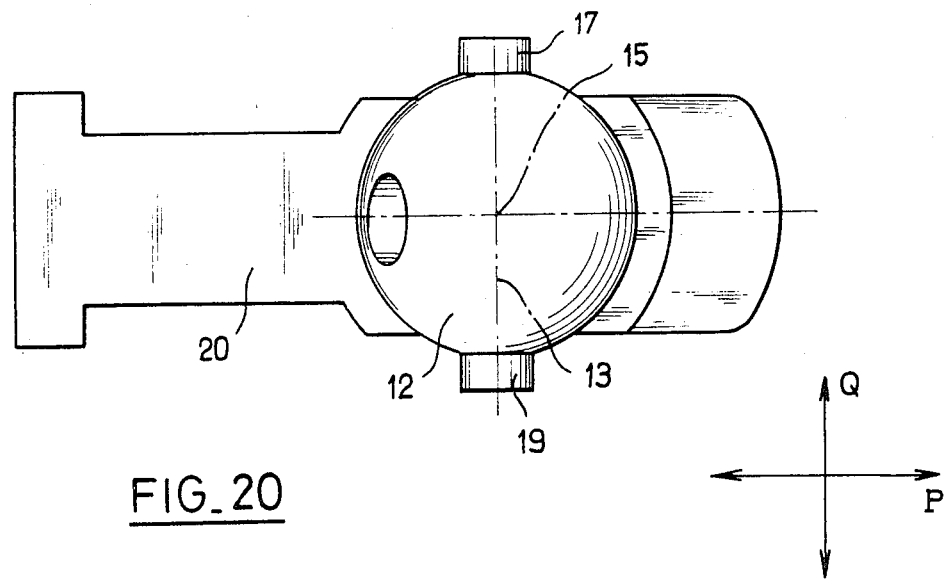
FIG_20
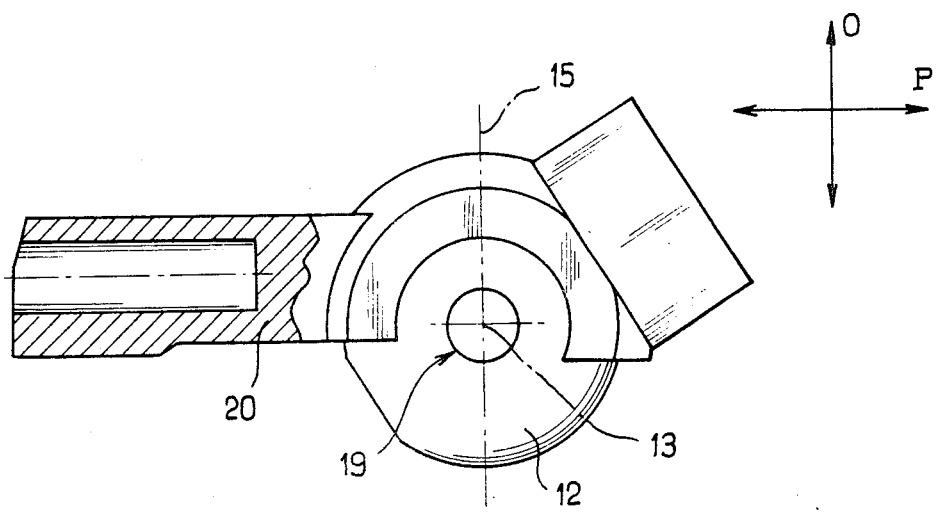
FIG_21

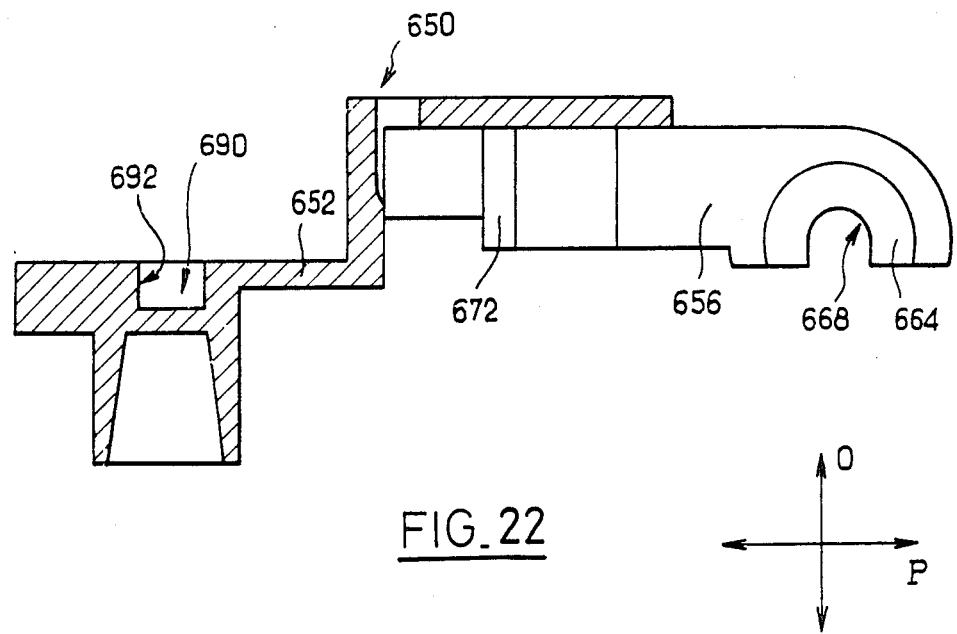
FIG_22
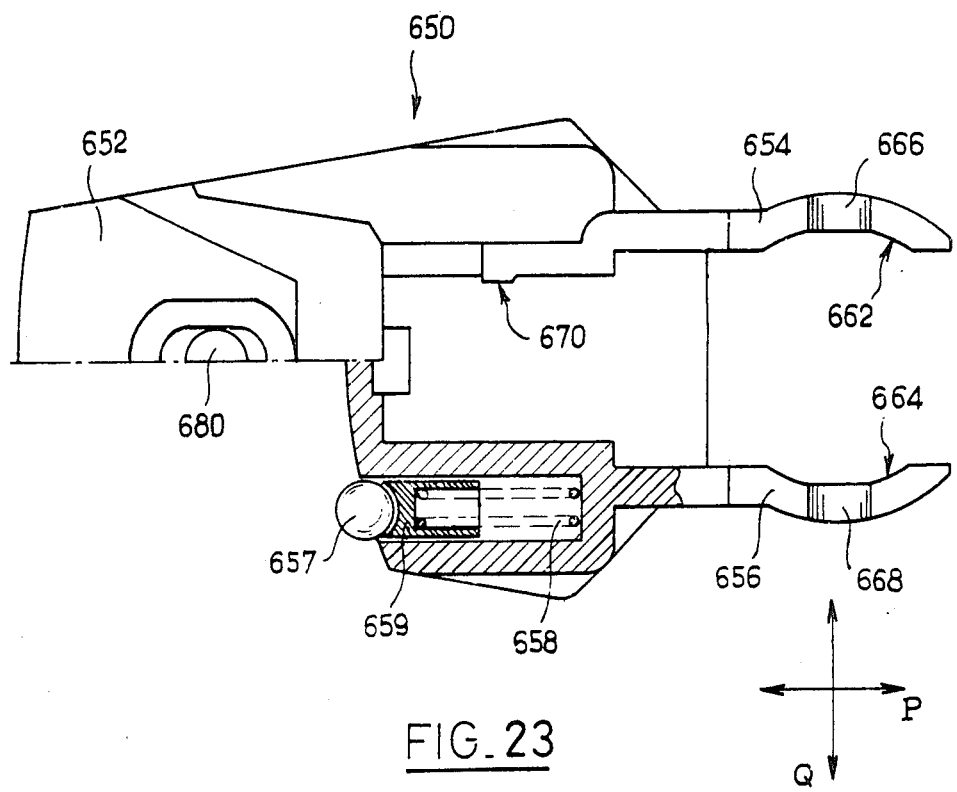
FIG_23

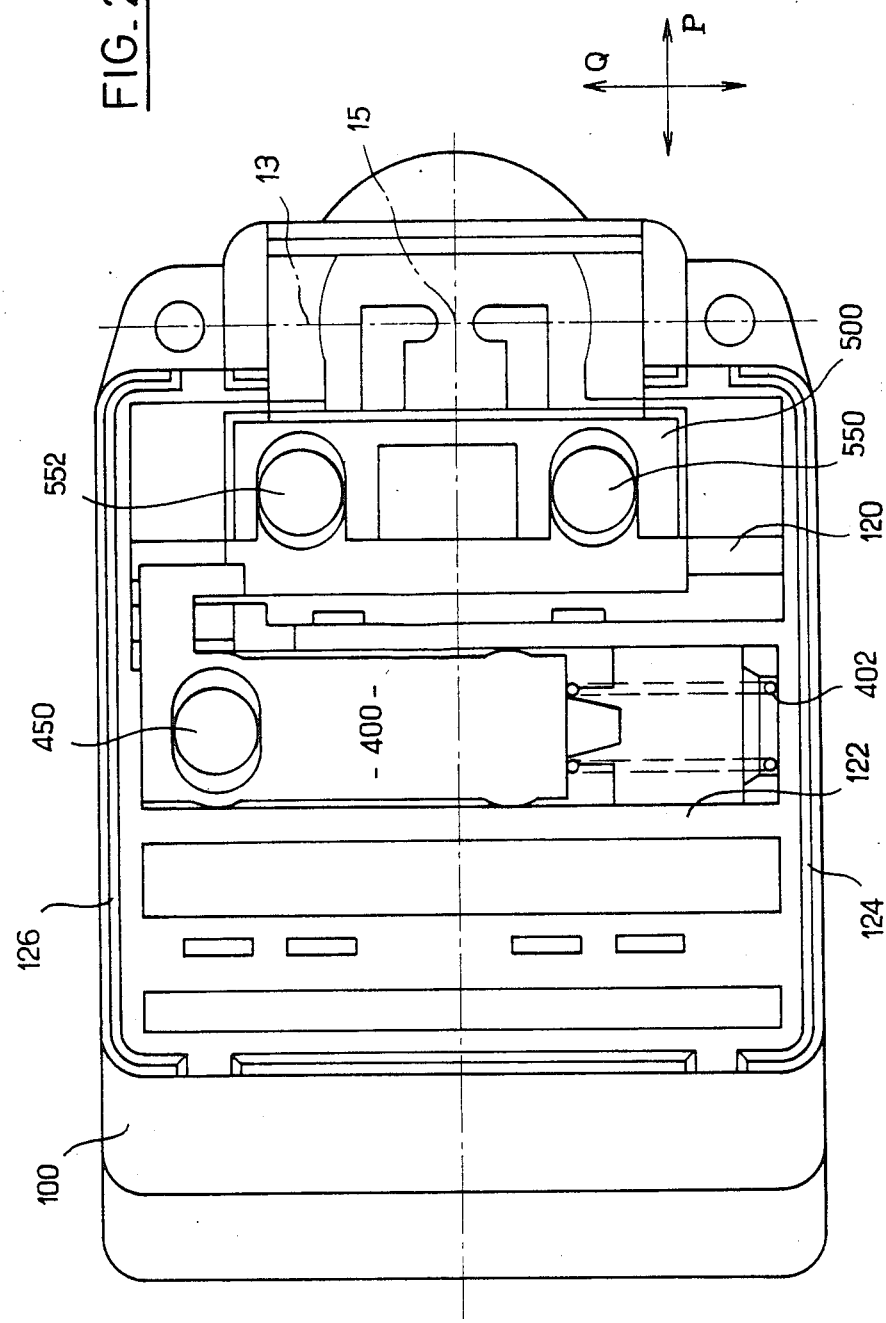

FIG_32
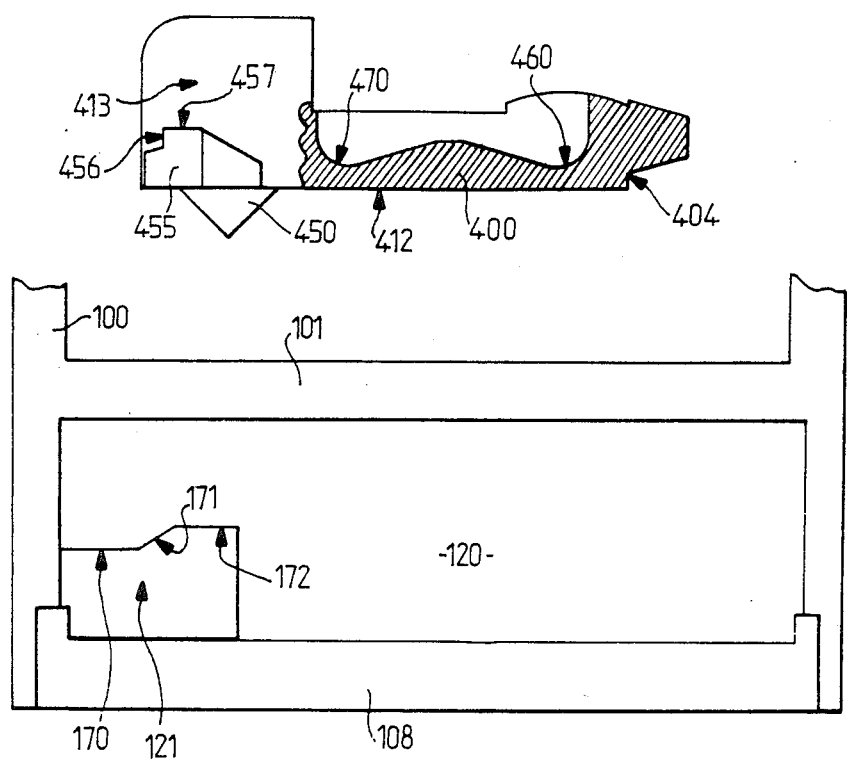
FIG_33
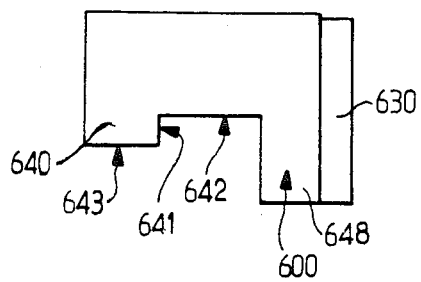
FIG_34

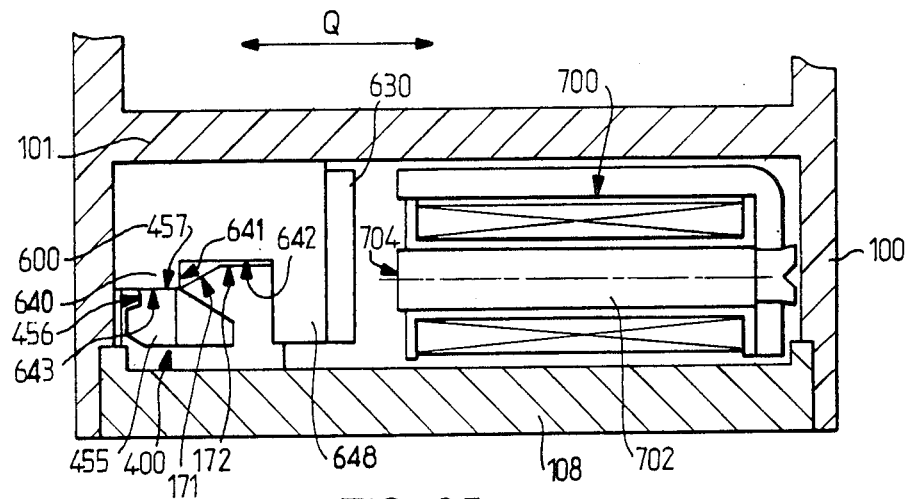
FIG_35
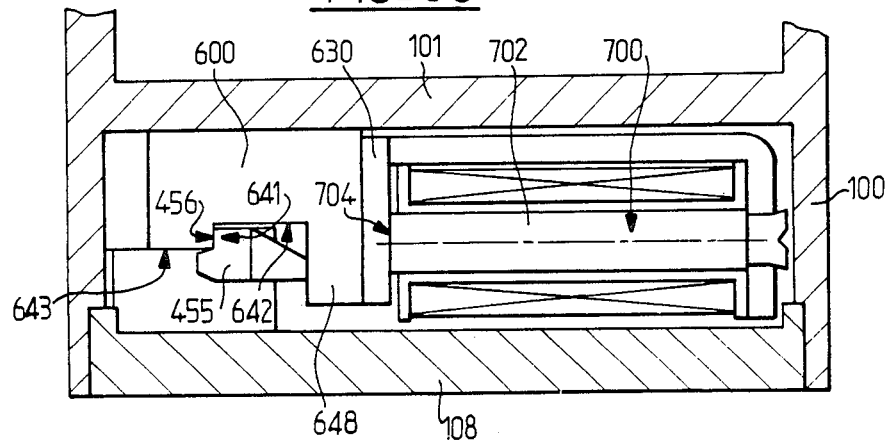
FIG_36
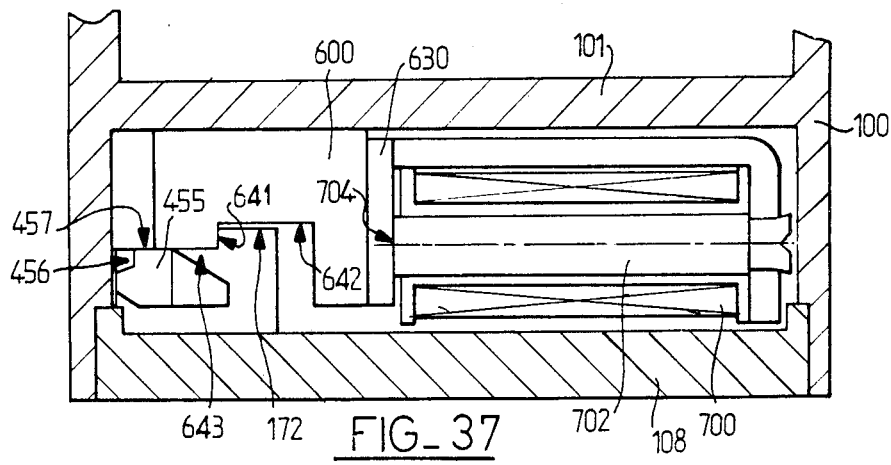
FIG_37

BISTABLE SWITCH, IN PARTICULAR FOR USE AS A HEADLAMP DIPSWITCH ON A MOTOR VEHICLE

The present relates to switches for motor vehicles, and more particularly to a bistable switch suitable for switching between the dipped beam and the main beam position of a vehicle headlamp. Such a switch is commonly referred to as a "dipswitch".

A first aim of the present invention is to provide a bistable switch which is simple in structure, cheap and reliable, which can be controlled by successive use of a single lever which is preferably moved with a rocking motion and which serves to switch the headlamps of a motor vehicle automatically between a dipped beam position and a main beam position.

Another aim of the present invention is to provide a bistable switch for controlling dipped/main beam switching on a motor vehicle and suitable for automatically returning to the dipped beam position whenever the headlamps are switched off and the side lights are switched on.

Another aim of the present invention is to provide a bistable switch which generates a low level of noise when operated.

Another aim of the present invention is to provide a bistable switch capable of switching power currents.

SUMMARY OF THE INVENTION

The present invention provides a bistable switch, in particular a dipswitch for switching between a dipped and a main beam position for vehicle headlamps, the bistable switch comprising:

a housing containing:

a control crosshead guided in translation between a rest position and a working position;

a toggle bar extending in the direction of control crosshead displacement, and pivotally mounted on the control crosshead about an axis extending transversely to the direction of crosshead translation;

a contact carriage capable of displacement in a direction generally perpendicular to the direction of crosshead displacement and to the pivot axis of the toggle bar, said contact carriage including:

at least one contact stud; and two sloping cam surfaces provided on a common face of the contact carriage facing the toggle bar, said cam surfaces alternately occupying a position facing said toggle bar depending on the position of the contact carriage in the housing.

The contact carriage is advantageously displaced between two positions and is resiliently urged towards a rest one of said positions which preferably corresponds to dipped beam operation.

Means are preferably provided to lock the contact carriage in its second position.

In one variant of these locking means, the contact carriage has a peg projecting perpendicularly to its direction of displacement and engaging in a slot provided in the housing or in an item fixed thereto, said slot including at least one locking segment extending parallel to the direction of crosshead displacement.

A bistable switch in accordance with the invention then preferably includes an element for unlocking the contact carriage, which element is suitable for covering the locking segment of the slot which extends parallel to the direction of crosshead displacement, thereby causing the contact carriage to return to its rest position.

The unlocking element may be fixed to prevent the contact carriage from being locked in its main beam position. In this case, the main beam position is unstable. However, the unlocking element may be controllably movable between a position in which it covers the locking segment of a slot which extends parallel to the direction of crosshead displacement, and a position in which it does not cover said segment. The unlocking element may be used, for example, to ensure that the bistable switch automatically returns to a dipped beam position whenever the means for controlling the lighting of the vehicle are moved from the headlamp position to a side light position. This disposition is described in detail below.

Advantageously, the toggle bar is resiliently urged towards a rest position in which it extends parallel to the direction of crosshead displacement.

It is also advantageous for the control crosshead to be resiliently urged towards its rest position aways from the contact carriage.

Preferably, the contact carriage has two bearing zones on its surface facing away from the control crosshead, said bearing zones bearing against the housing or an element connected thereto, and including the contact stud.

Advantageously, the stroke of the contact carriage and the positions of the camming slopes thereon are such that depending on the position of the carriage in the housing, the lines passing through the pivot axis of the toggle bar and one or other of the notches at the bottoms of the camming slopes against which the tip of the toggle bar comes into contact pass on either side of a bearing point between the contact carriage and the housing or an element fixed thereto at a face of the carriage facing away from the crosshead. This disposition is explained in greater detail below and serves, in particular, to cause the contact carriage to pivot in two opposite directions so as to alternate between being locked and being unlocked. In one position urging the carriage to be locked in a main beam position, the locking peg is urged into the locking segment of the slot which extends parallel to the direction of crosshead displacement. In contrast, when the contact carriage is pivoted the other way, the peg is urged out from the locking segment of the slot extending parallel to the direction of crosshead displacement in order to allow the carriage to return to its rest position, i.e. to the dipped beam position.

Preferably, a resilient member urges the peg towards the locking segment extending parallel to the direction of crosshead displacement, and the resilient member is advantageously constituted by a spring which co-operates with the contact stud carried by the carriage.

The present invention also seeks to provide a variant of the means for locking the contact carriage in the second position, said variant enabling the contact carriage to be returned to the rest position under remote control and also enabling the contact carriage to be selectively locked in the second position, i.e. making it possible to select between a first configuration in which the contact carriage is automatically locked in position whenever it reaches its second position, and a second configuration in which the contact carriage is not locked in this way.

This is achieved by means which resiliently urge the contact carriage towards a first position and by electromagnetically controlled locking means suitable for selectively holding the contact carriage in its second position whenever it is displaced thereto by the toggle bar associated with the crosshead.

For example, this first position may be used as the dipped beam position whenever the contact stud carried by the contact carriage serves to switch motor vehicle headlamps between dipped beam and main beam of motor vehicle headlamps. Whenever the electromagnetic locking means is released to its non-locking configuration, e.g. by the action of a lighting control switch going from a headlamp on position to a side light on position, then the dipswitch is automatically re-initialised to its dipped position.

Advantageously, the locking means comprise an electric coil which is selectively powered by an associated auxiliary switch, together with a slide carrying a locking member and displaceable by the carriage between a rest position corresponding to the first position of the carriage and a locking position corresponding to the second position of the carriage; the slide being held in the locking position so long as the coil is powered. Preferably, these locking means comprise two locking members respectively constituted by a peg extending perpendicularly to the direction of contact carriage displacement and a slot receiving the peg, said slot including at least one locking segment extending parallel to the direction of crosshead displacement, with one of the locking members being provided on the contact carriage and with the other locking member being provided on the slide.

In a preferred embodiment, the peg is fixed to the contact carriage while the slot is provided in the slide.

Advantageously, the contact carriage and the slide are guided in parallel translation.

Another aim of the invention is to limit the operating noise of the switch when the contact carriage is displaced. In order to do this, it is preferable in accordance with the present invention for the contact carriage to be suitable for displacement between two positions, with resilient means urging the carriage towards a first one of said positions and with the housing including a guide structure shaped in such a manner that when the carriage is displaced towards said first position it engages the guide structure at a non-normal incidence.

Preferably, the guide structure includes a cylindrical surface serving as an abutment surface and a guide surface for the carriage as it is displaced into its first position.

Another aim of the invention is to provide improved means for flashing headlamps when the crosshead is displaced from its rest position into its working position. Advantageously, these means comprise an electrically conductive blade supported by the control crosshead and by a spring interposed between the blade and the crosshead in such a manner that when the cross-head is displaced towards its working position it urges the blade to press against an electrically conductive tab mounted on the housing, with a predetermined force set by the spring.

In accordance with another advantageous characteristic of the invention, means are provided for selectively locking the contact carriage in its second position, i.e. for enabling the contact carriage to be locked or not locked at will whenever it reaches said second position, said means comprising means resiliently urging the carriage towards a first position and electromagnetically controlled locking mean for selectively holding the carriage in the second position when it is displaced thereto by the toggle bar associated with the crosshead, the locking means comprising an electric coil selectively powered by an associated auxiliary switch, a slide including a first locking member co-operating with a second locking member provided on the contact carriage and displaceable by the carriage parallel to the displacement of the carriage between a rest position corresponding to said first position of the carriage and a locking position corresponding to the second position of the carriage, the slide being held in its locking position when the coil is powered, and a slope controlling relative displacement between the contact carriage and the slide perpendicularly to the direction of displacement of the contact carriage whenever the carriage is displaced from the first position towards the second position in order to engage the locking members provided on the contact carriage and on the slide.

BRIEF DESCRIPTION OF THE DRAWINGS

Embodiments of the invention are described by way of example with reference to the accompanying drawings, in which:

FIG. 9 is a diagrammatic perspective view of the locking means;

FIG. 10 is a diagrammatic section through the locking means on a longitudinal section plane referenced X—X in FIG. 9;

FIG. 11 is a side view of the face of the slide directed towards the contact carriage, as seen in a direction referenced XI in FIG. 9;

FIGS. 12, 13, 14, 15, and 16 are diagrams showing different stages in the operation of a bistable switch including said locking means;

FIG. 20 is a plan view of a ball of the FIG. 17 switch in a view similar to that of FIG. 18;

FIG. 21 is a side view in partial section of the same ball in a view similar to the section plane of FIG. 17;

FIG. 22 is a section view in a plane similar to FIG. 17 showing a clevis in said switch;

FIG. 23 is a pair of half views of the clevis shown in FIG. 22, with the top half of FIG. 23 being a bottom view of the clevis similar to FIG. 18, and with the bottom half view of FIG. 23 showing the clevis on a section plane referenced XXIII—XXIII in FIG. 17;

FIG. 24 is a section view through the FIG. 17 switch on a section plane referenced XXIV—XXIV in FIG. 17;

FIGS. 32 to 37 show another embodiment of the locking means suitable for locking the contact carriage in its second position, and in particular:

FIG. 32 is a side view of a contact carriage used in this embodiment;

FIG. 33 is a side view of the housing receiving the slide;

FIG. 34 is a diagrammatic side view of the slide; and

FIGS. 35, 36, and 37 are diagrammatic side views of various stages in the operation of the switch including said locking means.

PREFERRED EMBODIMENTS OF THE INVENTION

Figure 1:
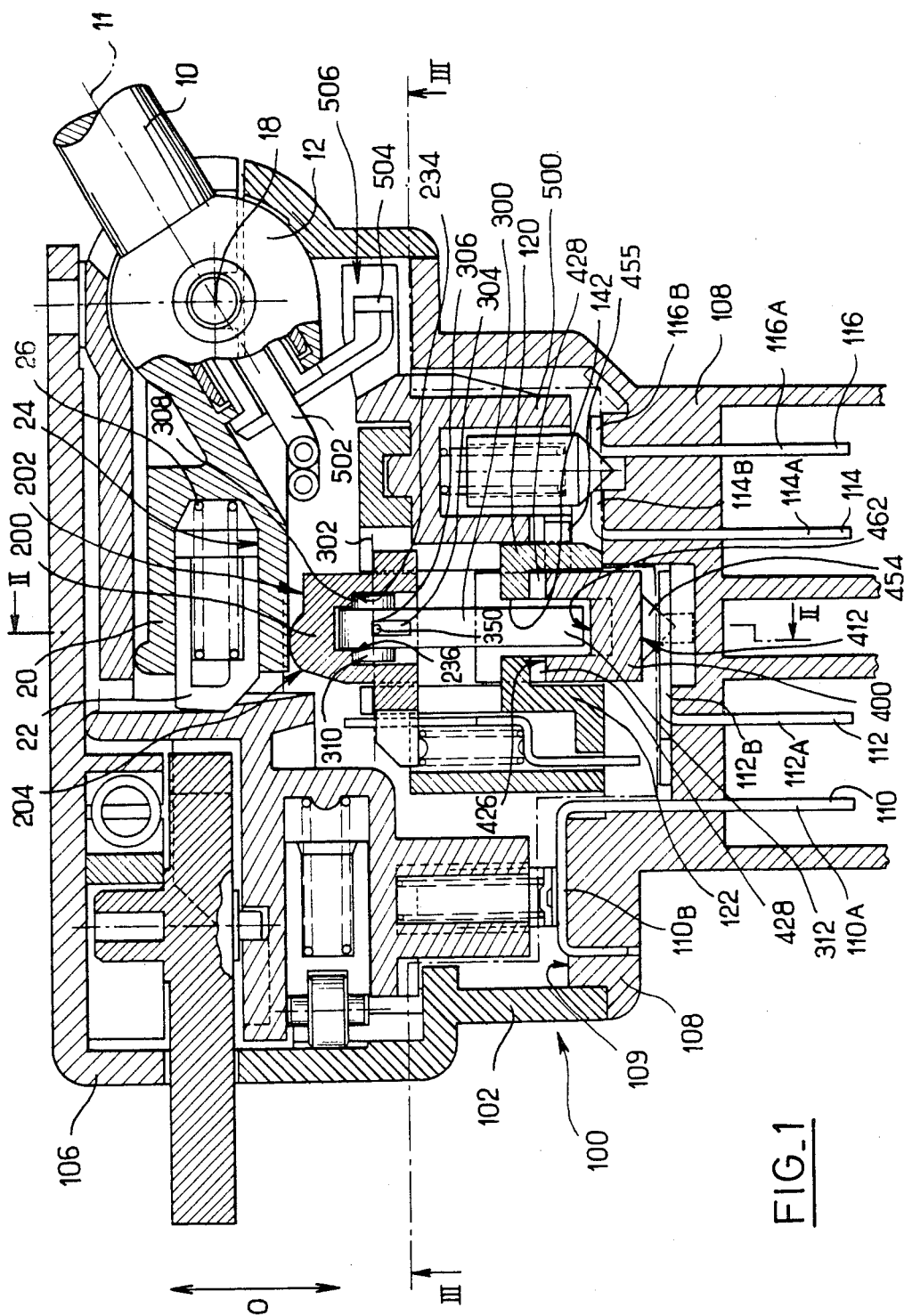
FIG. 1 is a diagrammatic section view through a bistable switch in accordance with a first embodiment of the present invention in a section plane referenced I—I in FIG. 2, the FIG. 1 section extends parallel to the direction of crosshead translation and perpendicularly to the direction of contact carriage translation.

For the purposes of simplification, the following description is made with reference to a system of orthogonal co-ordinates having three axes O, P, and Q shown diagrammatically in the figures and intercepting at right angles, said axes being referred to below respectively as the main axis, the secondary axis, and the auxiliary axis.

The main axis O is parallel to the planes of FIGS. 1, 2, 4, 5, 6, 7, 8, 10, 11, 12, 13, 14, 15, 16, 17, 19, 21, 22, 27, 29, 32, and 33, and is perpendicular to the planes of FIGS. 3, 18, 20, 23, 24, 25, 26, 30, 31, 34, 35, 36, and 37.

The secondary axis P is parallel to the planes of FIGS. 1, 3, 18, 20, 21, 22, 23, 24, 25, 26, 30, 31, 34, 35, 36, and 37, and is perpendicular to the planes of FIGS. 2, 4, 5, 6, 7, 8, 10, 11, 12, 13, 14, 15, 16, 17, 19, 27, 29, 32, and 33.

The auxiliary axis Q is parallel to the planes of FIGS. 2, 3, 4, 5, 6, 7, 8, 10, 11, 12, 13, 14, 15, 16, 18, 19, 20, 23, 24, 25, 26, 27, 29, 30, 31, 32, 33, 34, 35, 36, and 37, and is perpendicular to the planes of FIGS. 1, 17, 21, and 22.

FIRST EMBODIMENT SHOWN IN FIGS. 1 TO 8

In FIGS. 1 to 8, reference 100 designates the switch housing which houses a control crosshead 200, a toggle bar 300, and a contact carriage 400.

The housing 100 can be made in numerous different ways and is therefore not described in detail below.

Figure 2:
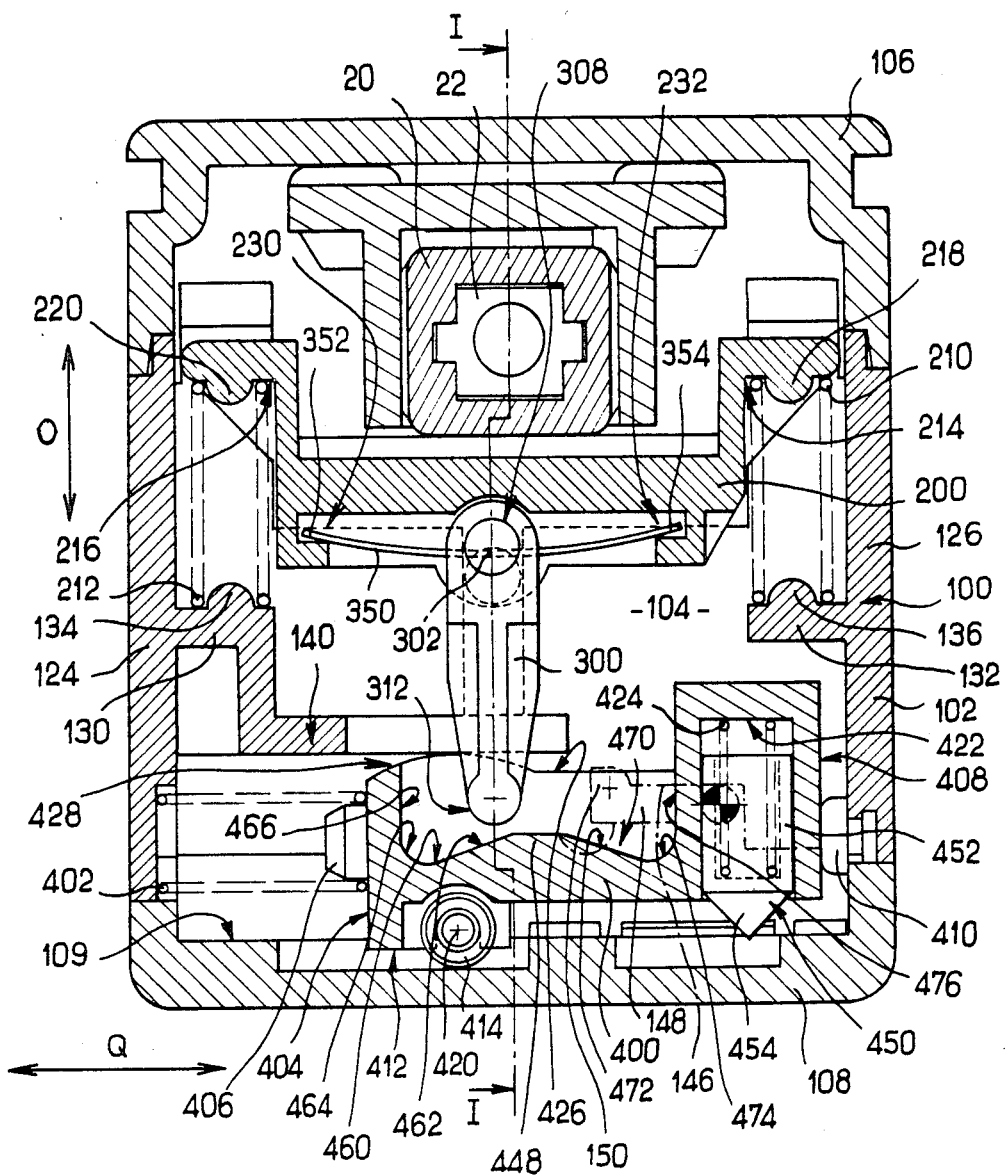
FIG. 2 is another section through the FIG. 1 switch on a section plane referenced II—II in FIG. 1, the section plane of FIG. 2 extends parallel to the direction of crosshead displacement and parallel to the direction of contact carriage displacement.
Figure 3:
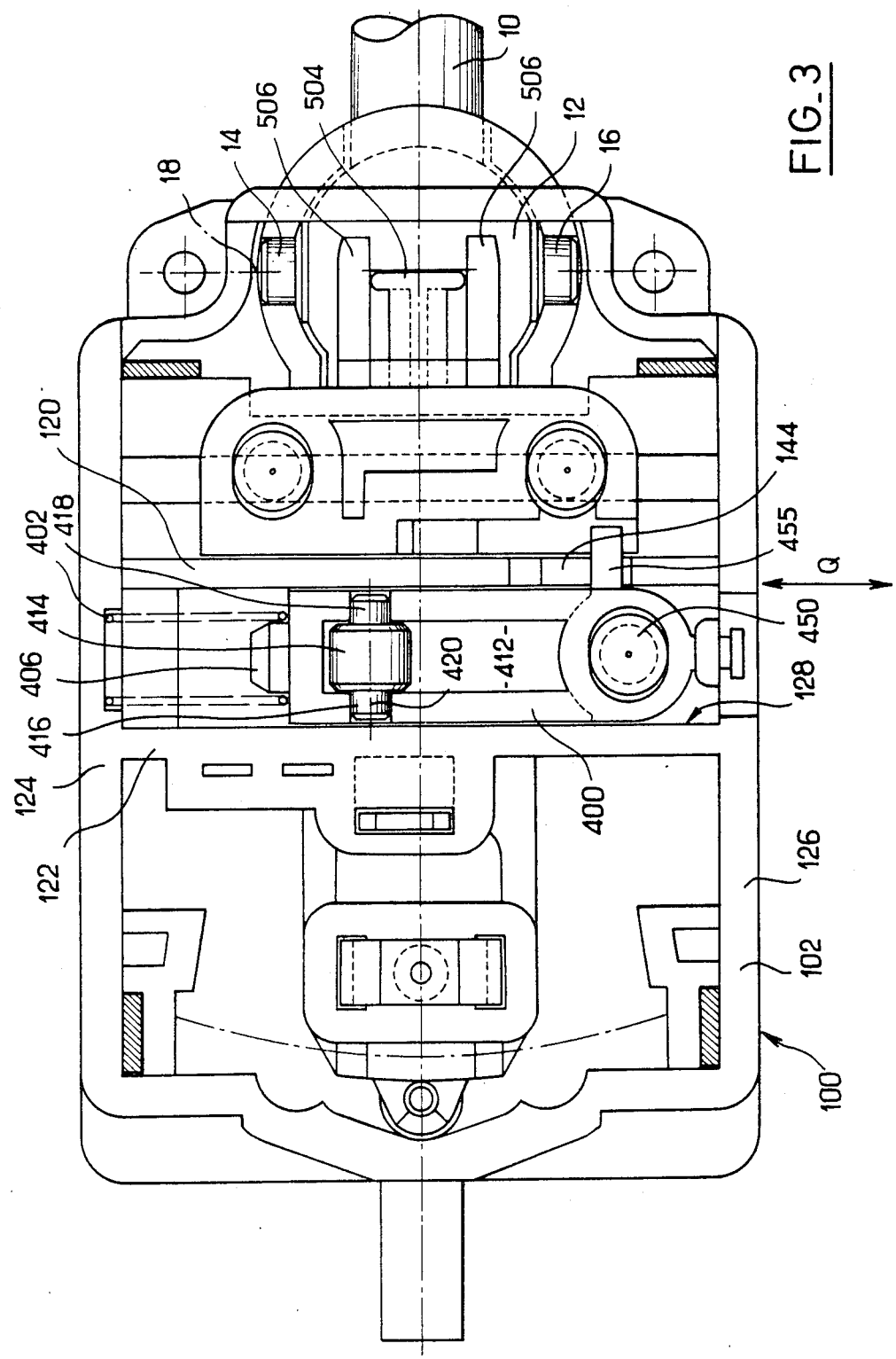
FIG. 3 is another section view of the FIG. 1 switch on a section plane referenced III—III of FIG. 1.

However, it can be seen that in the embodiment shown by way of example in FIGS. 1, 2, and 3, the housing 100 is constituted by an intermediate body 102 and two cover plates 106 and 108. The body 102 defines an inside volume 104 which opens out on either side of the body. The volume 104 is closed by the above-mentioned cover plates 106 and 108. The cover plates extend perpendicularly to the main axis O.

The cover plate 108 supports a plurality of electrical contact blades 110, 112, 114, and 116, which can be seen in FIG. 1. EAch of these blades preferably comprises a main length 110A, 112A, 114A, or 116A passing through the cover plate 108 and projecting out therefrom, and a secondary length 110B, 112B, 114B, and 116B which is orthogonal to the main length and which lies against the inside surface of the cover plate 108 in order to co-operate with contact studs mounted, for example, on the contact carriage 400. The body 102 has two side walls 124 and 126 extending generally parallel to the main and secondary axes O and P. Substantially halfway along the body 102 there are two parallel webs 120 and 122. These webs extend perpendicularly to the side walls 126 and 124 and substantially perpendicularly to the mean planes of the cover plates 106 and 108. Together with the side walls 124 and 126, the webs 120 and 122 define a chamber 128. The chamber 128 is of constant right section in a plane perpendicular to the section plane of FIGS. 1 and 2, and parallel to the section plane of FIG. 3. This chamber 128 slidably receives the control crosshead 200 and the contact carriage 400.

More precisely, the control crosshead 200 is guided in translation inside the chamber 128 by the webs 120 and 122 so as to slide parallel to the main axis O.

The chamber 128 also guides the contact carriage 400 to slide parallel to the auxiliary axis Q.

Figure 5:
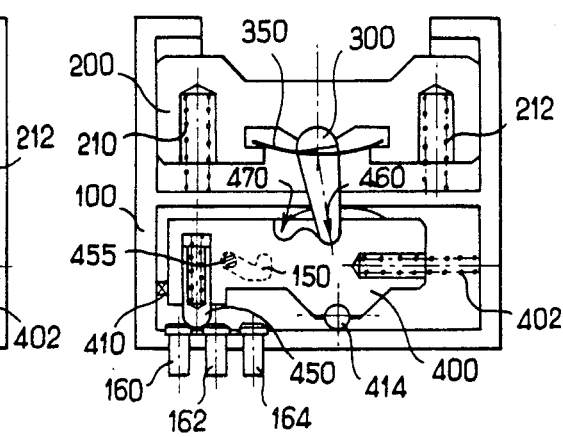
Figure 6:
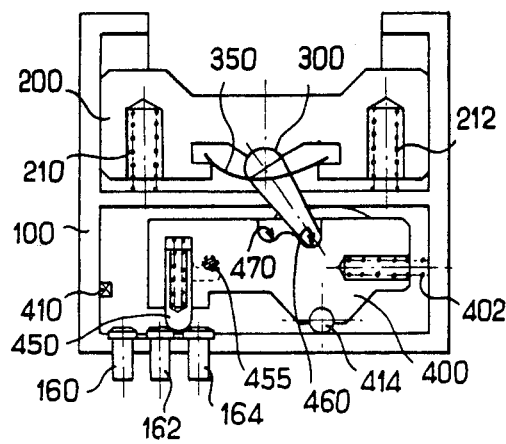
Figure 8:
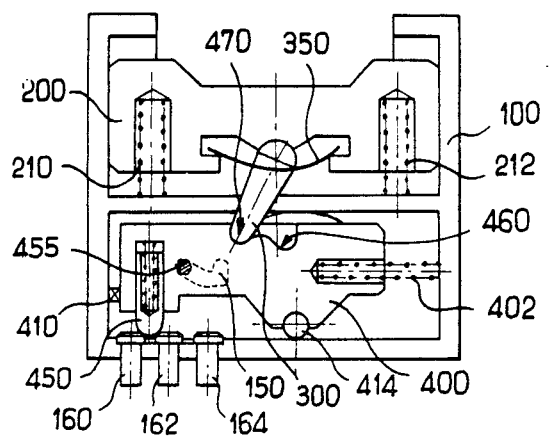

The control crosshead 200 is capable of moving inside the chamber 128 between a rest position as shown in FIGS. 1 and 2 in which the control crosshead 200 does not act on the contact carriage 400, and a working position shown diagrammatically in FIGS. 5, 6, and 8 in which the crosshead 200 controls displacement of the contact carriage 400 within the chamber 128 and parallel to the auxiliary axis Q.

The control crosshead 200 may be moved between the abovespecified specified rest and working positions by numerous types of drive means.

In the embodiment shown in FIGS. 1 and 2, the control crosshead 200 is caused to slide in the chamber 128 by a lever 10 which projects out from the housing 100 and which is rotatably mounted on the housing about an axis 18 by means of a ball 12 having diametrically opposite stub axles 14 and 16 extending coaxially about said pivot axis 18 and rotatably mounted on the body 102 of the housing. The pivot axis 18 of the control lever 10 extends parallel to the direction in which the contact carriage slides.

Inside the housing 100 and beyond the axis 18, the lever 10 is extended by a finger 20 which rests against the top surface 202 of the control crosshead. More precisely, the finger 20 rests against a cylindrically convex ridge 204 provided on the top surface 202 of the crosshead and extending in a direction generally parallel to the direction in which the contact carriage 400 slides, i.e. in a direction parallel to the auxiliary axis Q. Since the pivot axis 18 of the lever 10 is parallel to the webs 120 and 122 and lies outside the chamber 128, the person skilled in the art will readily understand that pivoting the lever 10 and thus the finger 20 about the axis 18 will cause the control crosshead to slide parallel to the above-mentioned main axis O by virtue of the contact between the finger 20 and the ridge 204 on the crosshead and by virtue of the mechanical guidance of the crosshead 200 provided by the chamber 128.

The lever 10 is preferably provided with means for indexing its position as it rotates about the axis 18. In the embodiment shown in FIGS. 1 to 8, this position indexing is provided by means of a stud 22 received in a blind bore 24 provided in the end of the finger 20, with the stud 22 being urged out from the bore 24 by a spring 26.

Further, the control crosshead 200 is urged towards its rest position as shown in FIGS. 1 and 2. In the embodiment shown in these figures, the crosshead 200 is urged towards its rest position by means of a pair of helical springs 210 and 212 which are interposed between bottom surfaces 214 and 216 of the crosshead, i.e. surfaces facing the contact carriage, and webs 130 and 132 projecting into the volume 104 from the hide walls 124 and 126.

More precisely, the springs 210 and 212 are held in place by means of hemispherical projections 218 and 220 provided on the surfaces 214 and 216 and by hemispherical projections 134 and 136 provided on the webs 130 and 132 and engaged in respective ends of the springs 210 and 212.

The toggle bar 300 extends generally parallel to the direction of crosshead displacement, i.e. parallel to the main axis O. The toggle bar 300 is mounted on the bottom face of the control crosshead 200, i.e. the face directed towards the contact carriage 400. The toggle bar 300 is pivotally mounted on the crosshead 200 about an axis referenced 302 which extends parallel to the secondary axis P.

The toggle bar 300 is resiliently urged towards a rest position shown in FIGS. 1 and 2 in which the toggle bar 300 extends in the general direction of crosshead displacement.

In the embodiment shown in FIGS. 1 to 8 the toggle bar 300 is resiliently urged towards this rest position by a spring 350. In the example shown, the spring 350 is an elongate "piano wire" type of spring engaged on the toggle bar 300 and supported by the control crosshead 200. More precisely the spring 350 passes through a hole 304 of rectangular right cross-section provided through the toggle bar 300. The hole 304 passes through the toggle bar 300 perpendicularly to its pivot axis 302. The hole 304 is provided on the opposite side of the pivot axis 302 to the control crosshead 200. The hole 304 has a plane face 306 directed towards the contact carriage 400 extending perpendicularly to the general direction of the toggle bar and coinciding substantially with the pivot axis 302. This plane face 306 serves as a bearing surface for the spring 350. The spring extends generally parallel to the auxiliary axis Q, i.e. to the direction in which the carriage 400 slides, over the bottom face of the crosshead 200, i.e. over its face directed towards the carriage 400. The ends 352 and 354 of the spring 350 are received in symmetrically disposed cavities 230 and 232 provided in the crosshead 200. The toggle bar 300 pivots about the axis 302 by means of two stub axles 308 and 310 coaxially disposed about the axis 302 and received on cylindrical bearing surfaces 234 and 236 facing the contact carriage 400 and provided on the surface of the crosshead 200.

The end of the toggle bar 300 adjacent to the contact carriage 400 has a semi-cylindrical tip 312 centered on an axis running parallel to the pivot axis 302.

The structure of the carriage 400 is now described. As mentioned above, the carriage 400 is slidably mounted in the chamber 128 to move parallel to the auxiliary axis Q. The carriage 400 is urged towards a rest position as shown in FIG. 2 by a helical spring 402. The spring 402 is disposed between the side wall 124 of the housing and a side surface 404 of the carriage 400 facing said side wall 124. The end of the spring 402 adjacent to the side surface 404 is engaged on a peg 406 which is fixed to the side wall. In the rest position shown in FIG. 2, the contact carriage 400 as urged by the spring 402 has its side surface 408 opposite to its side surface 404 resting against a resilient abutment 410, e.g. a rubber pad mounted on the side wall 126 of the housing.

The contact carriage 400 has its surface 412 which is furthest from the control crosshead 200 resting against the inside surface 109 of the cover plate 108 by means both of a wheel 414 and a contact stud 450. The contact wheel 414 is pivotally mounted on the carriage 400 about an axis 420 parallel to the pivot axis 302 of the toggle bar 300.

The contact wheel 414 is thus pivotally mounted on the carriage 400 by two stub axles 416 and 418 which are coaxial about the axis 420 and which rest against cylindrical bearing surfaces provided on the carriage 400 and directed towards the inside surface 109 of the cover plate 108.

The contact stud 450 rests against the secondary lengths of the contact blades supported by the cover plate 108, e.g. contact blade 112 as shown in FIG. 1. Thus, contact stud 450 is suitable for short-circuiting various pairs of contact blades in order to alternate between feeding full beam and dipped beam lamps in the headlamp system of a motor vehicle.

Contact stud 450 is received in a blind bore 422 provided in the carriage 400 and opening out to the bottom face 412 of the carriage 400.

Contact stud 450 is urged out from the bore 422 by a helical spring 424.

Advantageously, contact stud 450 comprises a cylindrical stock 452 whose outside diameter is substantially equal to the diameter of the bore 422, with a small allowance for play, and a conical head 454 which rests against the contact blades.

The top face 426 of the carriage 400, i.e. its face directed towards the crosshead 200 and opposite to abovespecified surface 412 has two convex cylindrical ridges 428 thereon. These convex ridges rest against a web 140 extending from the side wall 124 and from the webs 120 and 128, said web 140 projecting into the chamber 128 parallel to the auxiliary axis Q.

The web 140 has an oblong slot 142 through which the toggle bar 300 can pivot.

The points of contact between the cylindrical ridges 428 and the web 140 are defined by a generator line running parallel to the axes 302 and 420 and situated substantially in a plane parallel to the main axis O and passing through the pivot axis 420 of the contact wheel 414. As a result, the spring 424 urging the contact stud 450 out from the bore 422 tends to pivot the contact carriage 400 in an anti-clockwise direction, with reference to FIG. 2. In order to prevent such pivoting, the contact carriage 400 is provided with a peg 455 projecting perpendicularly to a plane defined by the main and auxiliary axes O and Q, with the peg being received in a slot 144 provided in the web 120. Spring 424 urges the peg 455 towards the crosshead 200. Thus, the peg 455 rests against the surface 146 of the slot 144 which faces away from the crosshead 200 and towards the cover plate 108.

The slot 144 has a main segment 148 which extends generally parallel to the auxiliary axis Q and a locking segment 140 which extends perpendicularly to the auxiliary axis Q. The locking segment 150 is disposed at the end of the main segment 148 furthest from the side wall 126 which carries the resilient pad 410 against which the carriage 400 comes into abutment in its rest position under the urging of the spring 402.

Further, on its face 426 directed towards the control crosshead 200, the contact carriage 400 has two camming slopes 460 and 470. These camming slopes 460 and 470 are suitable for co-operating in alternation with the tip 312 of the toggle bar 300. In order to do this, these camming slopes 460 and 470 are adapted to be alternate in the position opposite the tip 312 of the toggle bar 300, depending on the position of the carriage 400 in its displacement parallel to the auxiliary axis Q.

The cams 460 and 470 are defined by generator lines extending parallel to the above-specified pivot axes 302 and 320. The intermediate zone between the cams 460 and 470 is referenced 448 in FIG. 2.

Each of the cams 460 and 470 comprises, going away from the intermediate zone 448, i.e. towards the faces 404 and 408 respectively of the carriage, a sloping surface at an angle to the auxiliary axis Q and going towards the cover plate 108 as it goes away from the intermediate zone 448, and a bearing zone for the tip 312 of the toggle bar 300, which zone extends transversely to the auxiliary axis Q.

More precisely, in the embodiment shown in FIG. 2, each of the cams 460 and 470 has, going away from the intermediate zone 448, i.e. towards a respective one of the side faces 404 and 408 of the carriage, successively a plane face 462 or 472 at an angle to the auxiliary axis Q and sloping towards the cover plate 108 as it goes away from the intermediate zone 448, a surface 464 or 474 in the form of a semi-cylindrical concave notch, and then a bearing surface 466 or 476 which is plane and perpendicular to the auxiliary axis Q.

Depending on the position of the contact carriage 400 in the chamber 128, the intermediate zone 448 of the camming slopes is disposed to one side or the other of the tip 312 of the toggle bar 300. Thus, when the control crosshead 200 is driven in translation parallel to the main axis O by the lever 10, the tip 312 of the toggle bar 300 slides over one or other of the two plane surfaces 462 and 472 of the cams 460 and 470 and comes to rest against one of the semi-cylindrical concave surfaces 464 or 474 so as to urge the contact carriage in translation one way or the other parallel to the auxiliary axis Q.

This disposition is described in greater detail below. it may also be observed from accompanying FIGS. 1 to 8 that the locking segment 150 of the slot 144 extends perpendicularly to the auxiliary axis Q and towards the control crosshead 200 away from the main segment 148 of the slot. Thus, the locking segment 150 interrupts the bearing surface 146 of the slot facing away from the control crosshead 200 and serving as a bearing surface for the peg 455 in order to limit pivoting of the contact carriage 400 under the influence of the spring 424. Further, it can be seen from accompanying FIGS. 1 to 8 that the stroke of the contact carriage 400 parallel to the auxiliary axis Q and the positions of the cams 460 and 470 on the carriage 400 are such that depending on the position of the carriage 400 in the housing, generator lines passing through the pivot axis 302 of the toggle bar 300 and through one or other of the notches 464 and 474 at the ends of the camming slopes 460 and 470 pass respectively on either side of the point where the wheel 414 of the contact carriage 400 bears against the housing 100. The notches 464 and 474 correspond to the bearing surfaces for the tip 312 of the toggle bar 300.

This disposition ensures that when the tip 312 of the toggle bar 300 rests against the notch 464 of the cam 460 in order to displace the contact carriage 400 away from its rest position, the toggle bar 300 applies a pivoting couple on the carriage 400 in the same direction as the couple applied by the spring 424 when urging the peg 455 towards the locking segment 150, and thereby retains the contact carriage away from its rest position.

However, when the tip 312 of the toggle bar 300 rests against the semi-cylindrical notch 474 of the other cam 470, the toggle bar 300 urges the contact carriage 400 towards the position shown in FIG. 2, in co-operation with the spring 402. Further, the toggle bar 300 applies a pivoting couple to the carriage 400, clockwise as shown in FIG. 2, which opposes the couple applied by the spring 424 received in the bore 422, thereby releasing the peg 455 from the locking segment 150 in the slot 144 and thus unlocking the carriage 400 and allowing it to return to its rest position.

It will be seen from accompanying FIGS. 1 to 8 that the intermediate zone 448 between the camming slopes 460 and 470 also lies provided between the points of contact between the carriage 400 and the cover plate 108 as determined respectively by the contact wheel 414 and by the contact stud 450. Likewise, the slot 144 and the peg 455 are located between said points of contact.

Operation of the bistable switch shown in FIGS. 1 to 3 is now described with reference to FIGS. 4 to 8.

Figure 4:
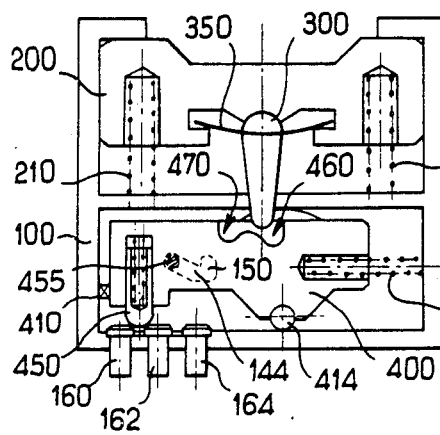
FIGS. 4, 5, 6, 7, and 8 are diagrams showing different stages in the operation of the FIG. 1 bistable switch.

In FIG. 4, the bistable switch is shown in its rest position.

The control crosshead 200 is urged away from the contact carriage 400 by the springs 210 and 212. The tip 312 of the toggle bar 300 is thus at a distance from the contact carriage 400, allowing the toggle bar 300 to be held in its rest position by the spring 350 so that the toggle bar extends substantially parallel to the main axis O. The contact carriage 400 is urged by the spring 402 against the resilient pad 410. The peg 455 is located at the furthest end of the slot 144 from its locking segment 150. The tip 312 of the toggle bar 300 is located opposite the plane surface 462 of the cam 460. The contact stud 450 has its conical head 454 short-circuiting two contact blades or contact tabs referenced 160 and 162 in FIG. 4, said contact blades or tabs being mounted on the cover plate 108 and passing therethrough. The electrical connection between the tabs 160 and 162 serves to close the circuit for feeding electricity to the dipped headlamp circuit of a motor vehicle.

FIG. 5 shows the first stage of control crosshead displacement for switching the headlamps from the dipped position to the full beam position. The control level 10 is pivoted about its axis 18 and the control crosshead 200 is displaced in translation parallel to the main axis O towards the contact carriage 400. When the tip 312 of the toggle bar 300 comes into contact with the surface 462 of the cam 460, the toggle bar 300 is pivoted clockwise as shown in FIG. 2, and anti-clockwise as shown in FIGS. 1 to 8. The tip 312 of the toggle bar 300 thus comes to bear against the cylindrical notch 464 of the cam 460. The spring 350 bends as the toggle bar 300 pivots. In this state, as shown in FIG. 5, the contact carriage 400 and the items bound thereto still occupy the same position as they previously occupied, and as shown in FIG. 4.

If the lever 10 is released, the control crosshead 200 returns to its rest position as shown in FIG. 4 under the urging of the springs 210 and 212. The position of the control crosshead 200 as shown in FIG. 5 is therefore an unstable position. This unstable position may be used for controlling auxiliary functions such as headlamp flashing, with such an arrangement being conventional and not described in greater detail below.

FIG. 6 shows the position of the control crosshead 200 and the contact carriage 400 after switching from the dipped headlamp position to the full beam position. As the control lever 10 continues to tilt about its axis 18, the control crosshead 200 moves further towards the contact carriage 400 against the resilient urging of the return springs 210 and 212. As shown in FIG. 5, after the tip 312 of the toggle bar has slid along the surface 462 and engaged the cylindrical notch 464 at the bottom of the cam 460, the axis of the toggle bar 300 passing through its pivot axis 302 and the point of contact between its tip 312 and the cylindrical notch 464 slopes relative to the direction of control crosshead translation towards the side wall 124 and towards the contact carriage 400. As a result, and as shown in FIG. 6, continued translation of the control crosshead 200 from the position shown in FIG. 5 where the tip 312 of the crossbar has just come into contact with the cylindrical notch 464, and the position shown in FIG. 6, gives rise to displacement of the contact carriage 400 towards the side wall 124 against the spring 402. During this displacement of the carriage 400, the peg 455 slides along the main segment 148 of the slot 144 towards its locking segment 150. It may be observed, that during this translation of the carriage 400 towards the side wall 124, the spring 424 applies a pivoting couple on the carriage, anti-clockwise as shown in FIG. 2 and clockwise as shown in FIGS. 4 to 8, urging the peg 455 against the surface 146 of the slot 144 which leads to the locking segment 150. Similarly, the projection of the generator line passing through the pivot axis 302 and the center of the point of contact between the tip 312 of the toggle bar 300 and the cylindrical notch 464 passes the point of contact between the wheel 414 and the cover plate 108 on the side thereof opposite to the peg 455. As a result, the toggle bar 300 also exerts a pivoting couple on the contact carriage 400 acting in the same direction as the spring 424. Thus, when the peg 455 reaches the locking segment 150 it is urged into the locking segment, thereby locking the contact carriage in the working position shown in FIG. 6. Once the peg 455 is held captive in the locking segment 150, the spring 402 can no longer return the contact carriage 400 to the rest position shown in FIG. 4.

The contact stud 450 which is moved with the contact carriage 400 therefore shorts together another pair of contact blades or tabs 162 and 164 mounted on the cover plate 108.

It may be observed that it is advantageous for the middle contact tab or blade 162 to be common to both pairs of contacts which are short-circuited by the stud 450 in the rest position or in the working position as shown in FIGS. 4 and 6. The connection existing between the contacts 162 and 164 in the position shown in FIG. 6 serves to feed electricity to the main beam circuit of a motor vehicle headlamp.

It may also be observed that the angle of inclination of the toggle bar 300 relative to the main axis O increases as the control crosshead 200 moves away from the position shown in FIG. 5 towards the position shown in FIG. 6 such that the force exerted on the control lever 10 to displace the contact carriage 400 falls off progressively. This disposition provides a snap action effect on contact carriage displacement and makes it possible to switch circuits carrying high powers.

Figure 7:
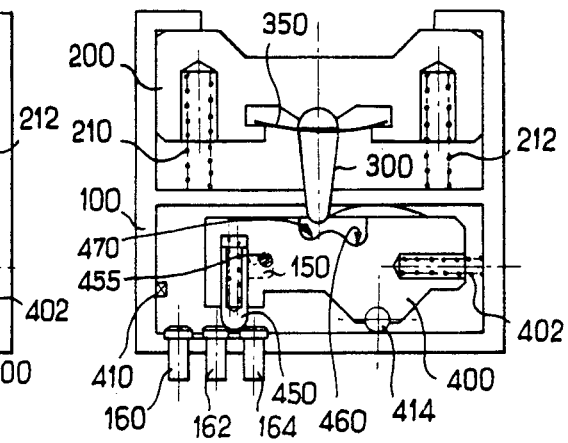

FIG. 7 shows a position occupied by the control crosshead 200, the toggle bar 300 and the contact carriage 400 after the control leve 10 has been released. The springs 210 and 212 return the control crosshead 200 to its rest position away from the contact carriage 400. The spring 340 can then return the toggle bar 300 to its rest position in which the toggle bar extends substantially parallel to the main axis O. The tip 312 of the toggle bar 300 is again at a distance from the cams 460 and 470. However, since the contact carriage 400 has been moved away from its rest position, the tip 312 of the toggle bar 300 is now located over the cam 470. The contact carriage 400 and the items bound thereto remain in the working position described above with reference to FIG. 6 by virtue of the peg 455 being engaged in the locking segment 150.

FIG. 8 shows the positions of the control crosshead 200, of the toggle bar 300, and of the contact carriage 400 after the lever 10 has been re-actuated in order to return the contact carriage 400 to the above-described rest position.

The control crosshead 200 is displaced a second time in translation parallel to the main axis O and moves towards the contact carriage 400 against the action of the springs 210 and 212. When the tip 312 of the toggle bar 300 comes into contact with the surface 472 of the cam 470, the toggle bar is pivoted in the opposite direction to that in which it was pivoted when passing from the FIG. 4 position to the FIG. 5 position. The tip 312 of the toggle bar 300 is caused to slide, in this case, over the surface 472 which slopes in the opposite direction to the above-mentioned surface 462. Thus, the toggle bar 300 pivots anti-clockwise as shown in FIG. 2 and clockwise as shown in FIGS. 4 to 8. The tip 312 of the toggle bar 300 reaches the notch 474 at the end of the cam 470. The toggle bar 300 then applies a pivoting couple to the contact carriage 400 in the opposite direction to that applied by the spring 424, thereby thrusting the peg out from the locking segment 150 and into the main segment 148 of the slot 144. The spring 420 in conjunction with the toggle bar 300 then snap the contact carriage 400 back into the rest position as shown in FIG. 8. The peg 455 moves along the main segment 148 away from the locking segment 150, and the contact stud is returned to a position where it short-circuits electrical contacts 160 and 162. The motor vehicle headlamp circuit is returned to the dipped position. The resilient pad 410 absorbs the shock of stopping the contact carriage 400. When the control lever 10 is released, the control crosshead 200 is returned to its rest position away from the contact carriage 400 by the springs 210 and 212. The toggle bar 300 returns to its rest position extending in the same direction as the main axis O under the effect of the spring 350. The tip 312 of the toggle bar 300 is again located facing the cam 460, as shown in FIG. 4. The switch is ready for a new operating cycle beginning by switching from the dipped position to the main beam position.

It may be observed, that when passing from the position shown in FIG. 7 corresponding to a main beam, to the position shown in FIG. 8 corresponding to a dipped beam, the pivot couple exerted by the toggle bar 300 on the contact carriage 400 to eject the peg 455 away from the locking segment 150 is due to the fact that unlike the state shown in FIG. 5, a generator line passing through the pivot axis 302 of the toggle bar 300 and the center of the point of contact of the toggle bar tip 312 against the cylindrical notch 474 passes the point of contact between the wheel 414 and the cover plate 108 on the same side as the slot 144.

Where appropriate, a bistable switch in accordance with the present invention may additionally include a unlocking element suitable for covering the locking segment 150 of the slot 144. If such an unlocking element permanently covers the locking segment 150, the position of the contact carriage 400 shown diagrammatically in FIG. 6 and corresponding to the main beam position becomes an unstable position. The peg 155 can no longer penetrate into the locking segment 150 so that carriage 400 is returned towards its rest position against the resilient abutment 410 by the spring 402 as soon as the control lever 10 is released. It is also possible to use a moving unlocking element which is controllable in position between a position in which it covers the locking segment 150 and a position in which it does not cover it. The locking element then allows the bistable switch in accordance with the present invention to operate in a more complicated manner. Such a locking element can be used to ensure that the switch returns to its rest or dipped position automatically under the effect of an auxiliary control without requiring the lever 10 to be operated again.

As mentioned above, the unlocking element may be controlled by means for switching the vehicle lighting to a side light position, so as to ensure that on any subsequent transition of the lighting from side lights to headlamps, the headlamps will initially be dipped and not full beam.

One such moving unlocking element for selectively covering the locking segment 150 may be constituted by equipment shown diagrammatically in FIG. 1 under the reference 500. This equipment 500 is guided in translation parallel to the auxiliary axis Q against the web 120. The moving equipment 500 is moved in translation by an eccentric finger 504 on a rod 502 which is engaged coaxially in the lever 10 and which is free to rotate about the axis 11 thereof. In the example shown in FIG. 1, the finger 504 is engaged in a fork 506 fixed to the moving equipment 500. The person skilled in the art will readily understand that pivoting the rod 502 about the axis 11 of the lever causes the finger 504 to pivot correspondingly and thereby moves the equipment 500 in translation so as to close and open the segment 150 in alternation. The equipment 500 is advantageously provided with a surface sloping relative to its direction of translation and suitable for engaging the peg 455 in order to remove it from the locking segment 150 when the equipment 500 is displaced towards its locking segment closure position.

THE LOCKING MEANS SHOWN IN FIGS. 9 TO 16

The peg 455 projects from the face 413 of the contact carriage 400 which is adjacent to the web 120. The peg 455 projects away from the side fae 413 of the contact carriage 400 perpendicularly to a plane defined by the main axis O and the auxiliary axis Q. The peg 455 is located on the carriage 400 between its contact wheel 404 and its contact stud 450.

The peg 455 constitutes a first locking member.

A second locking member is provided in the form of a slot 610 through the side face 602 of a slide 600.

More precisely, the slide 600 is guided in translation relative to the housing 100 in a direction parallel to the auxiliary axis Q. Thus, the slide 600 and the contact carriage 400 are disposed on respective sides of the web 120.

The slide 600 has a blade 630 of ferromagnetic material suitable for co-operating with a coil 700 which is fixedly mounted on the housing 100.

The slot 610 through the side face 602 of the slide 600 has a main segment 612 extending generally in the direction of translation of the contact carriage 400 and of the slide 600, and a locking segment 614 extending perpendicularly to said direction of translation and generally parallel to the main axis O.

The locking segment 614 is disposed at the end of the main segment 612 which is furthest from the side wall 126 of the housing against which the contact carriage 400 and the slide 600 are engaged in their rest positions.

The coil 700 is wound about a ferromagnetic core 702 which extends parallel to the auxiliary axis Q facing the slide 600.

The coil 700 and its core 702 are mounted on the housing 100 facing the slide 600 on the side furthest from the above-specified side wall 126 of the housing.

Figure 9:
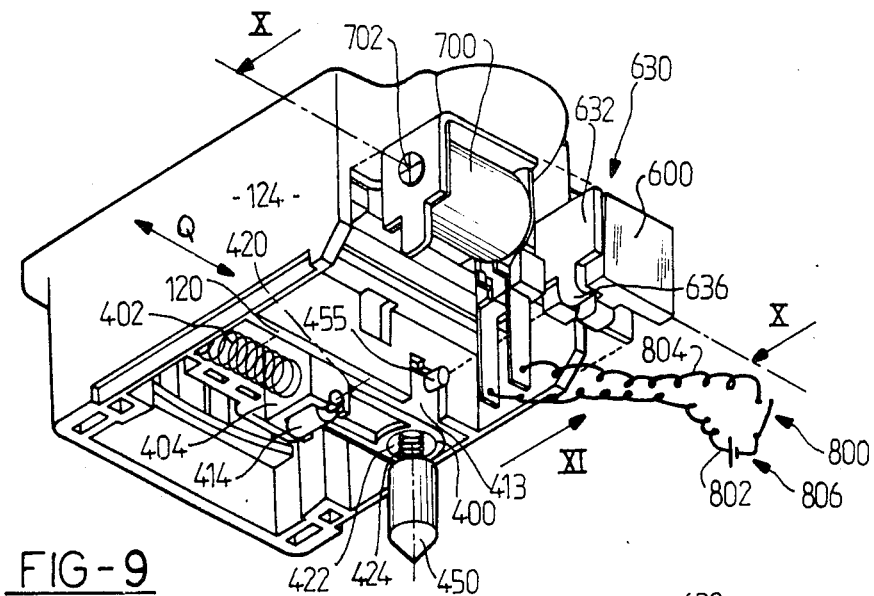
FIGS. 9 to 16 show a variant embodiment of the locking means associated with the contact carriage, and more precisely.

FIG. 9 shows diagrammatically an auxiliary control switch 800 connected to the terminals of the coil 700 by two wires 802 and 804 for selectively feeding current to the coil 700 from a source 806.

The above-specified blade 630 is carried on the slide 600 facing the core 702.

As shown in FIGS. 9 to 16, the blade 630 of ferromagnetic material mounted on the slide 600 is integrally formed with two generally parallel branches 632 and 634 interconnected by a transverse link 636. The blade 630 is thus generally U-shaped.

The blade 630 is engaged on a supporting bridge 620 fixed to the slide 600.

The supporting bridge 620 is of uniform cross-section in all section planes parallel to the plane defined by the main axis O and by the auxiliary axis O.

More precisely, the support 620 fixed to the slide 600 is delimited by a semi-cylindrical surface 622 about an axis parallel to the secondary axis P, and by two planes 624 and 626 extending said semi-cylindrical surface 622 and converging slightly as they go away therefrom.

The radius of curvature of the semi-cylindrical surface 622 is complementary to the inside radius of curvature of the link 636 in the blade 630.

Thus, the person skilled in the art will readily understand that when the blade of ferromagnetic material 630 is engaged on the supporting bridge 620, the blade 630 possesses a small degree of freedom being free to pivot about the axis of the semi-cylindrical surface 622 so that the branch 632 of the blade 630 which is closest to the core 702 can be moved slightly by pivoting about said axis, thereby leaving the blade 630 free to be pressed closely against the end face 704 of the core 702 in order to reduce the air gap between the core 702 and the blade 632 as much as possible.

It can be seen from FIG. 9 that the branch 632 of the blade 630 for being engaged against the end face 704 of the core 702 is preferably greater width than the link 636 and the other branch 634.

The person skilled in the art will readily understand from accompanying FIGS. 9 to 16 tha tthe spring 424 associated with the contact stud 450 urges the locking peg 455 against the surface 616 of the slot 610 which is directed away from the control crosshead 200.

The locking segment 614 opens out into this surface 616 which serves as a bearing surface for the peg 455.

The operation of the bistable switch shown in FIGS. 9 to 16 is now described with reference to FIGS. 12 to 16.

In these figures, only the locking slot 610 provided on the slide 600 is shown in continuous lines, and the remaining items are shown in dot-dashed lines.

Figure 12:
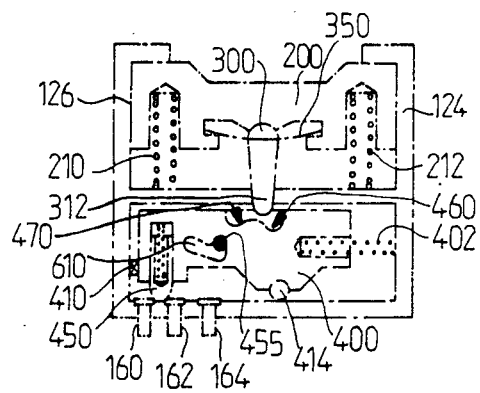

FIG. 12 shows a bistable switch in its rest position.

The control crosshead 200 is urged away from the contact carriage 400 by its return springs 210 and 212. The tip 312 of the toggle bar 300 is at a distance from the contact carriage 400. The toggle bar 300 is put into its rest position by the spring 350 and extends substantially parallel to the direction in which the control crosshead 200 slides. The contact carriage 400 is urged by the spring 402 against the abutment pad 410. The peg 455 is located in the locking segment 614 of the slot 610 in the slide 600.

The tip 312 of the toggle bar 300 faces the cam 460. The contact stud 450 short-circuits two electrical contacts 160 and 162 advantageously serving to supply electricity to the dipped headlamp circuits of a motor vehicle.

Figure 10:
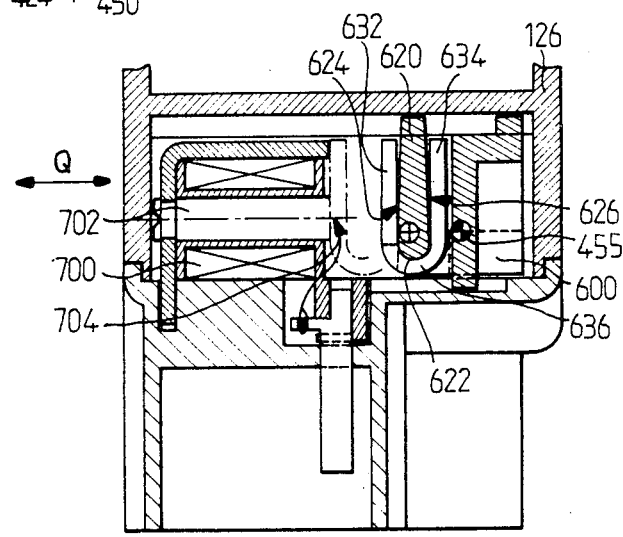
Figure 11:
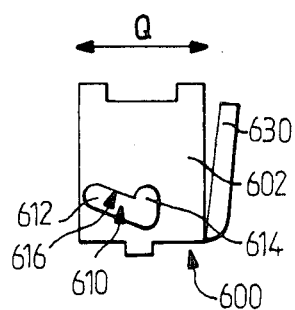

Since the peg 455 is engaged in the locking segment 614, the slide 600 is held in its rest position adjacent to the side wall 126 of the housing, as shown in FIGS. 9 and 10.

Consequently, the slide 600 is at a distance from the coil 700. The blade 630 is thus at a distance from the core 702.

Figure 13:
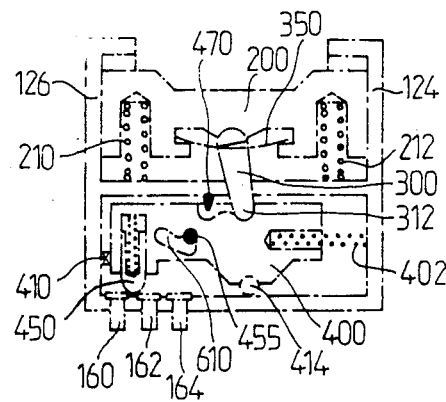

FIG. 13 shows the first stage of the control crosshead 200 being moved to switch from dipped headlamps to full beam headlamps. The crosshead 200 is moved in translation towards the contact carriage 400. The tip 312 of the toggle bar 300 slides over the cam 460 towards the notch at the end thereof, thereby pivoting the toggle bar 300 anti-clockwise as shown in FIGS. 12 to 16.

The spring 350 bends as the toggle bar 300 pivots. In the state shown in FIG. 13, the contact carriage 400 and the slide 600 occupy the same position as that described with reference to FIG. 12. Consequently, the peg 455 is still in the locking segment 614 of the slot 610.

If the lever actuating the control crosshead 200 is released, then the crosshead returns to its rest position as shown in FIG. 12 under the resilient force provided by its return springs 210 and 212.

The position of the control 200 shown in FIG. 13 is thus an unstable position.

This unstable position may be used to control auxiliary functions such as flashing headlamps. This arrangement is conventional and is not described in greater detail below.

Figure 14:
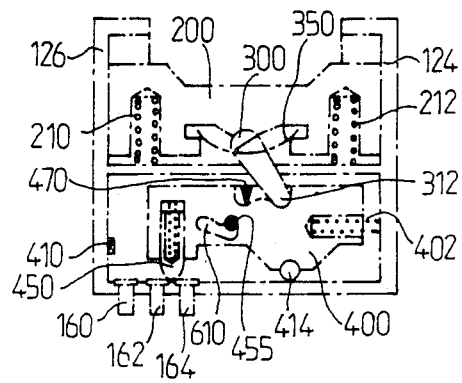

As the control crosshead 200 continues to move towards the contact carriage 400 against the resilient force of its return springs 210 and 212, the headlamps are switched from a dipped position to a full beam position, as shown in FIG. 14. After the tip 312 of the toggle bar has slid into the notch at the end of the cam 460, the axis of the toggle bar 300 passing through its pivot axis 302 and through the central contact point of its tip 312 with the notch at the bottom of the slope 460 is at a slope relative to the direction in which the control crosshead 200 slides and is sloping away from the above-mentioned side surface 126 towards the contact carriage 400. As a result, and as shown in FIG. 14, continued translation of the control crosshead 200 from the position shown in FIG. 13 in which the tip 312 of the toggle bar 300 has just made contact with the end of the cam 460, and the position shown in FIG. 14, causes the contact carriage 400 to be displaced away from the side wall 126 parallel to the auxiliary axis O and against its return spring 402.

During this displacement, the peg 455 drives the slide 600 in translation in the same direction towards the coil 700.

When the contact carriage 400 has reached the second position illustrated illustrated in FIG. 14, the blade 630 fixed to the slide 600 comes to rest against the core 702 of the coil 700.

It may be observed that while the contact carriage 400 is moving away from the side wall 126, the spring 424 is exerting a pivot couple, clockwise as shown in FIGS. 12 to 16, urging the peg 455 against the bottom of the locking segment 614. At the same time, the extension of the generator line passing through the pivot axis 302 and the center of the point of contact between the tip 312 of the toggle bar 300 and the cam 460 passes the point of contact between the wheel 414 and the housing 100 on the opposite side to the peg 455. As a result, the toggle bar 300 also exerts a pivot couple on the contact carriage 400 acting in the same direction as the spring 424. This prevents the peg 455 from leaving the locking segment 614.

In the second position of the contact carriage 400 as shown in FIG. 14, the contact stud 450 which moves with the contact carriage 400 short-circuits a different pair of electrical contact blades or tabs 162 and 164 mounted on the housing 100. The electrical connection between the tabs 162 and 164 serves to put the motor vehicle headlamps in the full beam position.

If the auxiliary switch 800 is open, the coil 700 is not powered. In this case, when the lever controlling displacement of the control crosshead 200 is released, the crosshead 200 and the associated toggle bar 300 are returned to the rest position as shown in FIG. 12 by the return springs 210 and 212, and the contact carriage 400 is likewise returned to the first position shown in FIG. 12 by its return spring 402. The slide 600 follows the contact carriage 400 and is brought to a rest position adjacent to the side wall 126 of the housing by virtue of the peg 455 engaging in the locking segment 614.

The stud 450 then short-circuits the pair of contacts 160 and 162 in order to close the circuit for dipped beam headlamps.

The main beam position shown in FIG. 14 thus corresponds under these conditions to an unstable position.

However, when the auxiliary switch 800 is closed, the coil 700 is powered. In this case, the components of the switch occupy the position shown in FIG. 15 when the lever for displacing the control crosshead 200 is released after moving the contact carriage 400 into the second position as shown in FIG. 14.

Figure 15:
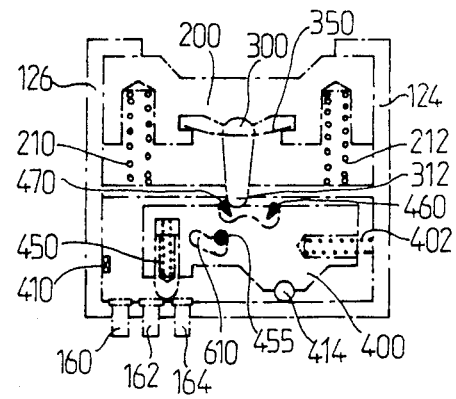

It will be seen from FIG. 15 that the return springs 210 and 212 return the control crosshead 200 to its rest position away from the contact carriage 400, identically to the first position shown in FIG. 12.

The spring 350 returns the toggle bar 300 to its rest position in which it extends substantially parallel to the main axis O. The tip 312 of the toggle bar 300 is again at a distance from the cams 460 and 470.

However, the slide 600 is held against the coil 700 and away from the side wall 126.

As a result, the contact carriage 400 is held in the second position against the resilient return force of the spring 402 because the peg 455 is engaged in the locking segment 614.

Thus, because of the displacement of the contact carriage 400 in translation, the tip 312 of the toggle bar 300 is now located opposite the cam 470. In other words, while the coil 700 is powered by the auxiliary switch 800, the second position of the contact carriage 400 becomes a stable position.

The contact carriage 400 may be remotely returned to the rest position as shown in FIG. 12 by opening the auxiliary switch 800.

As soon as the coil 700 is no longer powered, the slide 600 is no longer held in the locking position at a distance from the side wall 126, and the return spring 402 returns the contact carriage 400 together with the slide 600 towards the side wall 126 by virtue of the peg 455 being engaged in the locking segment 614.

The switch is then back in the position shown in FIG. 12.

Figure 16:
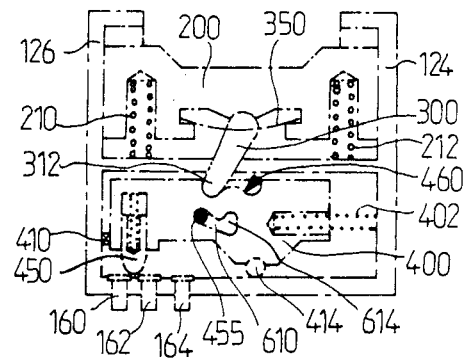

The contact carriage 400 may also be returned to its first or rest position as shown in FIG. 12 by a further displacement of the control crosshead 200 back towards the contact carriage 400, as shown in FIG. 16.

FIG. 16 shows the position of the control crosshead 200 after it has been displaced a second time parallel to the main axis O to bring it towards the contact carriage 400 from the position shown in FIG. 15, as described above, and against the return force of the springs 210 and 212.

When the tip 312 of the toggle bar 300 comes into contact with the cam 470, the toggle bar 300 is pivoted in the opposite direction to that in which it was previously pivoted when passing from the position shown in FIG. 12 to the position shown in FIG. 13. The tip 312 of the toggle bar 300 then slides along the cam 470. As a result the toggle bar 300 pivots clockwise as shown in FIGS. 12 to 16. The tip 312 of the toggle bar 300 engages the notch at the end of the cam 470 and thus applies a pivoting couple to the contact carriage 400 in opposition to that exerted by the spring 424, thereby pushing the peg 455 out from the locking segment 614 into the main segment 612 of the slot 610. The spring 402 together with the toggle bar 300 then snaps the contact carriage 400 back into the rest position as shown in FIG. 16. This rest position is identical to that shown in FIG. 12, so far as the contact carriage 400 is concerned.

The peg 455 moves along the main segment 612 away from the locking segment 614 and the contact stud 450 short-circuits electrical contacts 160 and 162. The motor vehicle headlamps are returned to the dipped position.

The resilient pad 410 absorbs the shock of the contact carriage 400 coming into abutment against the wall 126.

Meanwhile, the slide 600 is held in its locking position away from the side wall 126 of the housing. When the control lever associated with the control crosshead 200 is released, the crosshead 200 returns to its rest position away from the contact carriage 400 under the effect of its return springs 210 and 212, as shown in FIG. 12. The toggle bar 300 returns to its rest position under the effect of the spring 350.

The tip 312 of the toggle bar 300 is again opposite the cam 460, as shown in FIG. 12.

The switch is ready to begin a new operating cycle by switching from dipped beam to main beam.

It may be observed that when passing from the position shown in FIG. 15 corresponding to a main beam, to the position shown in FIG. 16 corresponding to a dipped beam, the pivot couple exerted by the toggle bar 300 on the carriage 400 tending to eject the peg 455 out from the locking segment 614 is due to the fact that a line passing through the pivot axis 302 of the toggle bar 300 and the center of the point of contact between the tip 312 of the toggle bar and the notch at the end of the cam 470 passes on the same side of the contact point between the wheel 414 and the housing 100 as the slot 610. In other words, the position shown in FIG. 16 differs in this respect from the position shown in FIG. 13.

When the control crosshead 200 is again brought towards the contact carriage 400 by means of an associated actuator lever and starting from the position shown in FIG. 16, the crosshead 200 and the carriage 400 recycle through the displacement stages shown in FIGS. 13 and 14.

In a first stage, the tip 312 of the toggle bar 300 slides along the cam 460 towards the notch at the end thereof. The toggle bar is thus pivoted anti-clockwise, as shown in FIGS. 12 to 16. As the control crosshead 200 continues to move towards the contact carriage 400 against the resilient force of the return springs 210 and 212, the contact carriage 400 is again moved towards the second position away from the side wall 126.

During this movement of the contact carriage 400 in translation parallel to the auxiliary axis Q, the peg 455 slides along the main segment 612 of the slot 610 towards the locking segment 614. It may be observed that as mentioned above with reference to FIGS. 13 and 14, while the carriage 400 moves away from the side wall 126, the spring 424 exerts a pivoting couple on the carriage 400, clockwise as shown in FIGS. 12 to 16, which urges the peg 455 against the surface 616 of the slot 610 leading into the locking segment 614. Similarly, the extension of a line passing through the pivot axis 302 and the point of contact between the tip 312 of the toggle bar 300 and the notch at the end of the cam 640 passes the point of contact between the wheel 414 and the housing 100 on the opposite side to the peg 455. Thus, the toggle bar 300 exerts a pivoting couple on the contact carriage 400 which acts in the same direction as the spring 424. As a result, when the peg 455 comes level with the locking segment 614 it is urged into the locking segment, thereby locking the contact carriage 400 in its working position as shown in FIGS. 14 and 15.

So long as the coil 700 continues to be powered, the peg 455 is held prisoner in the locking segment 614, and the spring 402 cannot return the contact carriage 400 to its rest position as shown in FIG. 12.

The contact stud 450 which moves with the contact carriage 400 again short-circuits the pair of contacts 162 and 164. However, if the power to the coil 70 is switched off between the moment when the contact carriage 400 reaches the rest position shown in FIG. 16 and the moment when the contact carriage 400 reaches the second position shown in FIG. 14, then in spite of the peg 455 penetrating into the locking segment 614 of the slot 610, the second position of the contact carriage 400 corresponds to an unstable position because the slide 600 including the locking slot 610 is no longer fixed away from the side wall 126, and as a result the contact carriage 400 and the slide 600 which is connected thereto by means of the peg 455 are returned to the first position as shown in FIG. 12 by the spring 402 as soon as the lever actuating the control crosshead 200 is released.

In conclusion, the contact carriage 400 can be maintained in the second position as shown in FIGS. 14 and 15 only while the slide 600 is held away from the side wall 126 by the coil 700 being powered.

As soon as the coil 700 is no longer powered, the second position of the contact carriage 400 as shown in FIGS. 15 and 16 becomes an unstable position.

As a result, when the coil 700 is unpowered, the contact carriage 400 is permanently urged into its rest position as shown in FIG. 12 by the spring 402.

In contrast, when the coil 700 is powered, successive displacements of the control crosshead 200 towards the contact carriage 400 serve to switch the contact carriage between the two positions shown in FIGS. 12 and 15, thereby sequentially switching the headlamps of a motor vehicle between the dipped position and the main beam position.

Finally, the contact carriage 400 can be automatically reinitialized into its rest position as shown in FIG. 12 which corresponds to the vehicle headlamps being in the dipped position by switching off the power supply to the coil 700, since whenever the coil 700 loses power it releases the slide 600 which includes the locking slot 610 co-operating with the peg 455.

In a variant, the peg 455 could be fixed to the slide 600 which co-operates with the coil 700 and the locking slot 510 including the locking segment 614 for co-operating with the peg 455 could be provided on the contact carriage 400.

In this case, the locking slot 610 should be provided the other way round relative to the positions described above and relating to the provision of the locking slot 510 on the slide 600.

More precisely, when the locking slot 610 is provided on the contact carriage 400, the locking segment 614 should be at the end of the main segment 612 which is closest to the side wall 126 of the housing, which side wall also carries the resilient pad 410 against which the carriage 400 comes into abutment when in its rest position under the urging of the spring 402.

Further, the locking segment 614 would then need to be oriented away from the control crosshead 200 rather than towards it.

STRUCTURE OF THE SECOND EMBODIMENT SHOWN IN FIGS. 17-31

The electric switch shown in these figures is essentially constituted by a housing 100, a control lever 10, a control crosshead 200, a toggle bar 300, and a contact carriage 400 substantially as described above, however it further includes a lighting selecting carriage 500 and a clevis 650.

The control lever 10 is supported by a ball 12. The ball 12 is pivotally mounted on the upper cover plate 106 about two orthogonal axes 13 and 15. The axis 13 is parallel to the auxiliary axis Q. The axis 15 is parallel to the main axis O.

The ball 12 is fixed to a finger 20 which extends substantially radially relative to the pivot axis 13. The finger 20 rests against the top face 202 of the crosshead 200.

The toggle bar 300 rests against two cylindrical bearing surfaces 234 and 236 centered on the pivot axis 203 and defined in the bottom surface of the control crosshead 200, via a pair of stub axles 308 and 310. The spring 350 is constituted by a resilient blade 350.

Figure 17:
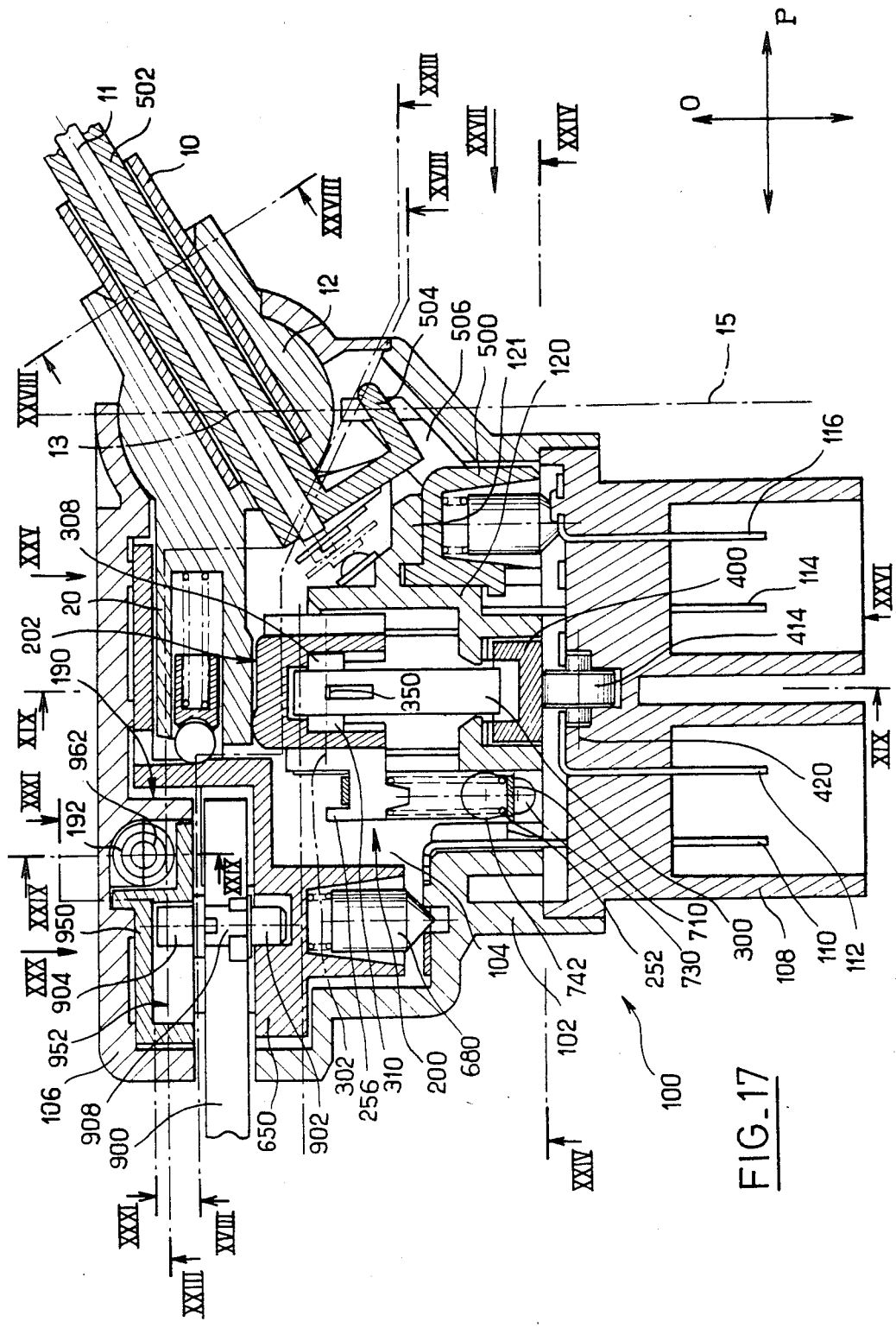
FIG. 17 is a diagrammatic longitudinal section through a second embodiment of a bistable switch in accordance with the invention on a section plane referenced XVII—XVII in FIG. 18.

As shown in accompanying FIG. 17, a rod 502 is engaged coaxially in the lever 10 and is free to rotate about the axis 11 of the lever. The rod 502 is provided with an eccentric finger 504 engaged in a fork 506 fixed to the lighting selection carriage 500. The lighting selection carriage 500 is guided in translation parallel to the auxiliary axis Q by the web 120 and a rib 121 fixed to the housing, and is thus moved in translation when the rod 502 is rotated about the axis 11.

The lighting selection carriage 500 preferably includes two contact studs 550 and 552 resting against sets of associated electrically conductive blades for selecting various different modes of lighting as it is moved, passing successively through an off position, a side lights position, and a headlamp position which may be main beam or dipped beam depending on the position of contact carriage 400.

The clevis 650 is essentially constituted by a base 652 and two tines 654 and 656.

The clevis 650 rests against the ball 12 by means of first bearing surfaces 662 and 664, by means of second bearing surfaces 666 and 668, and by means of third bearing surfaces 670 and 672 which engage the finger 20 projecting from the ball 12.

The first bearing surfaces 662 and 664 are defined by concave spherical surfaces complementary to the outside surface of the ball 12. The second bearing surfaces 666 and 668 are defined by concave cylindrical surfaces complementary to the outside surfaces of the stub axles 17 and 19 projecting from the ball 12. The stub axles 17 and 19 are diametrically opposite and coaxial about a common axis 13. Finally, the third bearing surfaces 670 and 672 are defined by plane surfaces parallel to the main axis O and to the secondary axis P.

As a result from the co-operation as defined above between the clevis 650 and the ball 12, the clevis 650 follows the ball 12 when it rotates about the axis 15. However, the ball 12 is free to pivot relative to the clevis 650 about the axis 13.

Naturally, the rod 502 of the lever is free to rotate about its longitudinal axis 11 relative both to the ball 12 and to the clevis 650.

The clevis 650 has a contact stud 650 resiliently urged against electrically conductive blades carried by the housing 100.

When the clevis 650 pivots about the axis 15, the stud 680 connects various different pairs of blades together to activate the left or right direction indicator lights of the vehicle.

In the embodiment shown in FIGS. 2 and 3, there is a resilient pad 410, e.g. made of rubber, mounted on the side wall of housing towards which the contact carriage 400 is urged by the spring 402 when in its rest position.

However, the Applicant has observed that adding such a resilient abutment pad to the housing for the purposes of attenuating operating noise also adds non-negligible extra expense and complication in assembling the switch.

That is why the present embodiment employs a guide structure 170 fixed to the side wall 124 of the housing towards which the contact carriage 400 is urged by its return spring 402. The guide structure 170 is shaped so that as the carriage 400 moves into its rest position, it comes into contact with the guide structure 170 at a non-normal incidence.

More precisely, the guide structure 170 defines a concave surface facing the contact carriage 400 and acting as an abutment therefore. This surface is delimited by generator lines extending parallel to the secondary axis P. The above-specified concave surface comprises, running from the side wall 124 of the housing and extending inwardly therefrom, a cylindrical portion 172 about an axis parallel to the secondary axis P, followed by a plane portion sloping away from the bottom cover plate 108 of the housing, with the contact carriage 400 engaging said concave surface on the inside of the housing 100.

The radius of this concave surface on the guide structure 170 is chosen to be slightly greater than the radius of the facing convex surface on the contact carriage 400 so that the initially glancing engagement between the abutment 170 and the carriage 400 changes smoothly towards a substantially normal incidence until a position of mechanical equilibrium is reached between the carriage 400 and the combined effects of the springs 402 and 424.

Figure 19:
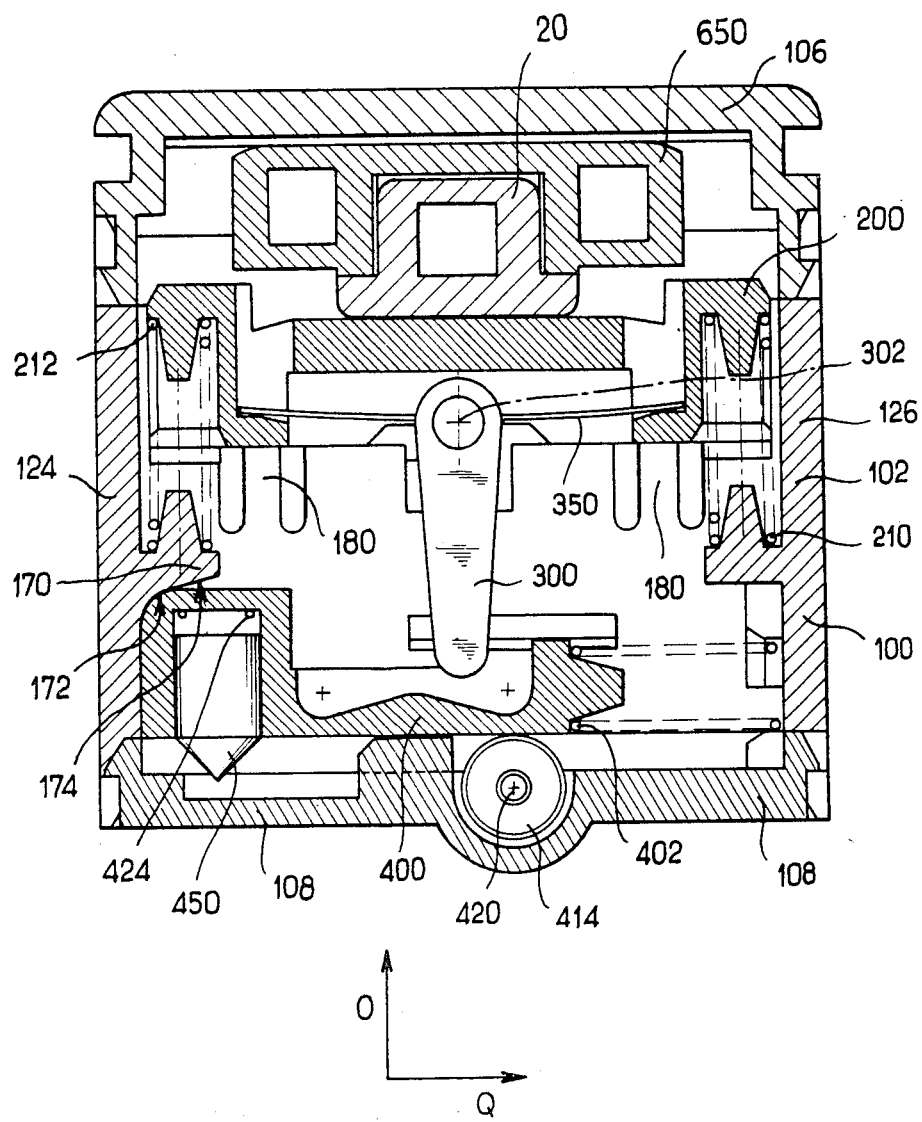
FIG. 19 is a cross-section through the FIG. 17 switch on a section plane referenced XIX—XIX in FIG. 17, which plane is orthogonal to the longitudinal section plane XVII—XVII also referenced in FIG. 17.
Figure 25:
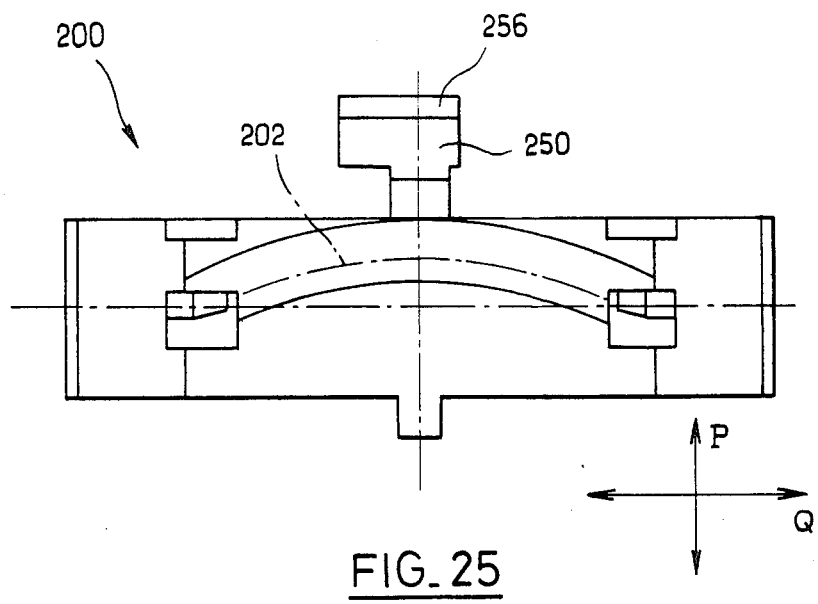
FIG. 25 is a plan view of the control crosshead used in the FIG. 17 switch seen along arrow XXV in FIG. 17.
Figure 26:
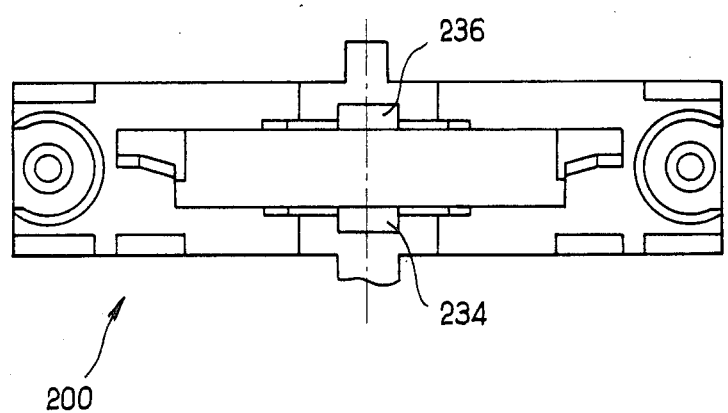
FIG. 26 is a bottom view of the same control crosshead seen along arrow XXVI in FIG. 17.

It is recalled, as explained above, that when the contact carriage 400 moves towards its second position against the resilient force of its own return spring 402, the spring 424 associated with the contact stud 450 exerts a pivoting couple on the carriage 400. This pivoting couple tends to move the end of the carriage including the stud 450 away from the bottom cover plate 108. Thus, when the contact carriage 400 is returned to its rest position as shown in FIG. 19 by the spring 402, its end including the contact stud 450 initially comes into contact with the plane segment 174 of the guide structure 170 at a non-normal incidence. Thereafter, since the components of the switch and in particular the contact carriage 400 and the housing 100 are made of plastic material which is at least slightly deformable, the noise of switch operation due to the contact carriage 400 coming into abutment against the surface 174 is very small. The contact carriage 400 slides along the plane segment 174 and into the cylindrical surface 172. As a result the carriage 400 is displaced somewhat towards the bottom cover plate 108.

The structure of the contact blade for flashing the headlamps is now described. This blade has the reference numeral 710 and is shown in detail in FIG. 27.

It is recalled that the headlamps are flashed when the control crosshead 200 is moved towards the contact carriage 400 without actually displacing it.

Figure 27:
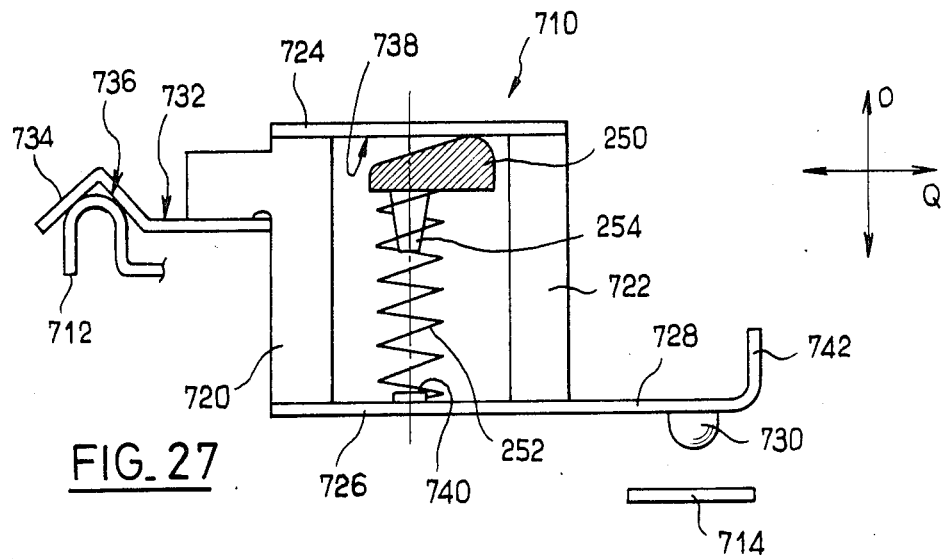
FIG. 27 is a side view of a headlamp flashing blade used in the FIG. 17 switch and seen along arrow XXVII.
Figure 28:
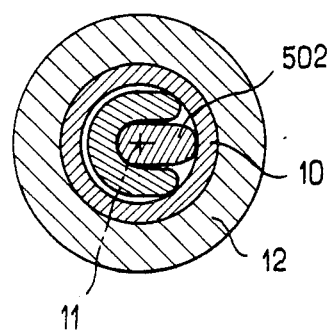
FIG. 28 is a section through the control lever of the FIG. 17 switch on a plane referenced XXVII—XXVII.
Figure 29:
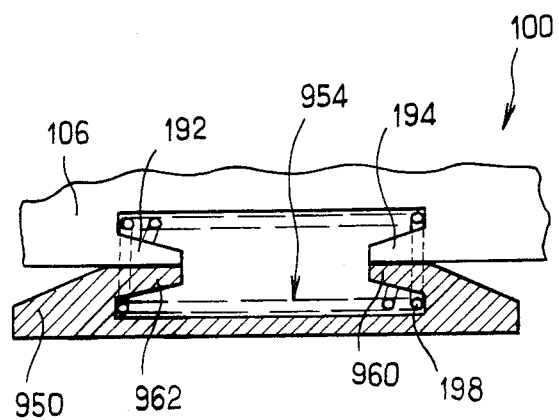
FIG. 29 is a fragmentary section view of the FIG. 17 switch on a section plane referenced XXIX—XXIX.

The headlamps flash when the blade 710 interconnects two blades referenced 712 and 714 in FIG. 27.

The blade 710 is mounted on a finger 250 fixed to the control crosshead 200.

The blade 710 is formed by stamping and folding a plate of electrically conductive material, and is therefore a single piece item.

Its structure essentially comprises a frame having two risers 720 and 722, and two cross-members 724 and 726. The parallel risers 720 and 722 are substantially parallel with the main axis O. The parallel cross-members 724 and 726 interconnecting the risers 720 and 722 are substantially parallel to the auxiliary axis Q.

The cross-member 726 extends beyond the riser 722 in the form of a wing 728 carrying a contact tab 730 which faces the above-mentioned blade 714.

In addition, the riser 720 is extended away from the frame constituted by the risers 720 and 722 and the cross-members 724 and 726 by a branch 732. This branch has two orthogonal folds 734 and 736 which rest permanently against the above-mentioned blade 712 in order to provide electrical contact therewith and to form a pivot bearing for the blade 710.

The finger 250 provided on the control crosshead 200 extends substantially parallel to the secondary axis P. It passes inside the frame defined by the risers 720 and 722 and the cross-members 724 and 726.

More precisely, the finger 250 rests against the side surface 738 of the cross-member 724 which is further from the bottom cover plate 108 of the housing on which the blade 714 is mounted.

The finger 724 is resiliently urged to press against the inside surface 738 of the cross-member 724 by a spring 252 interposed between the finger 250 and the cross-member 726. The spring 252 is kept in place by a peg 254 fixed to the finger 250 and by a peg 240 fixed to the cross-member 726.

The free end of the wing 728 carrying the contact tab 730 includes an extension 742 folded way from the bottom cover plate 108. The extension 742 follows a cylindrical envelope centered on an axis parallel to the auxiliary axis. This extension 742 is used for guiding the blade 710 as it pivots on the blade 712 while moving towards and away from the blade 714.

It may also be observed that the blade 710 is prevented from sliding over the finger 250 away from the crosshead 200 parallel to the secondary axis P by virtue of a lug 256 fixed to the finger 250 extending substantially parallel to the main axis O away from the bottom cover plate 108.

The cross-member 724 is thus held captive between the body of the crosshead 200 and the lug 256 by virtue of the resilient force exerted by the spring 252.

Thus, in order to facilitate switch assembly, the contact blade 710 may be preassembled on the crosshead 200.

It may also be observed from FIG. 27 that is the top cross-member 724 of the blade 710 extends substantially parallel to the auxiliary axis when in the rest position, the top surface of the finger 250 fixed to the crosshead 200 is inclined relative to the cross-member 724. The top surface of the finger 250 slopes away from the top cross-member 724 towards the riser 720 which carries the pivot branch 732. Thus, as shown in FIG. 27, the branch 732 having the folds 734 and 736 and serving as a bearing surface on the blade 712, and the contact zone defined between the finger 250 and the top cross-member 724 are respectively located on either side of the axis along which the spring 252 acts. As a result, the spring 252 exerts a permanent pivot couple on the blade 710 urging the folds 734 and 736 of the blade 710 against the blade 712.

Further, by virtue of the above disposition the folds 734 and 736 are maintained in permanent contact with the blade 712 prior to the tab 730 coming into contact with the blade 714.

When the control crosshead 200 is displaced towards the contact carriage 400 by pivoting the ball 12 about the axis 13, the contact tabe 730 fixed to the blade 710 comes into contact with the blade 714. The force exerted by the contact tab 730 on the blade 714 is defined by the spring 252. The spring 252 is sufficiently flexible to define a constant force.

In accordance with another aspect of the invention, at least one of the webs 720 and 722 in the housing 100 is provided with resilient tongues 180 suitable for limiting the displacement of the crosshead 200 as it moves away from the bottom cover plate 108 under the urging of the return springs 210 and 212.

These tongues 180 extend away from the bottom cover plate 108 and project at their free ends distant from the bottom cover plate towards the inside of the chamber 128 which slidably receives the control crosshead 200.

The tongues 180 bend elastically when the crosshead 200 together with the above-described blade 710 is engaged between the webs 120 and 122. Subsequently, the blades 180 return elastically to their rest position in order to prevent the control crosshead 200 from returning. This arrangement greatly facilitates switch assembly by holding the control crosshead 200 in position on the body of the housing 100 without requiring separate additional items to be used.

In order to avoid disturbing operation of the switch, the pre-assembly position of the control crosshead 200 as defined by the resilient tongues 180 is further from the bottom cover plate 108 that the position it occupies after the switch has been completely assembled and the control crosshead 200 comes to rest against the finger 20 projecting from the ball 12.

It may also be observed that in the embodiment shown in FIG. 2, the contact carriage 400 rests against the bottom cover plate 108 by means of a wheel 414 whose axis 420 is parallel to the secondary axis P. In the embodiment shown in FIGS. 17 and 19, the wheel 414 is rotatably mounted on the bottom cover plate 108 itself. The axis of rotation of the wheel 414 remains parallel to the secondary axis P.

The structure of the return means associated with the clevis 650 is now described.

The displacement of the clevis about its axis of rotation 15 is indexed by pushers 650 fitted with wheels 657 which are resiliently urged by associated springs 658 against an indexing surface 190 defined inside the housing 100.

Figure 18:
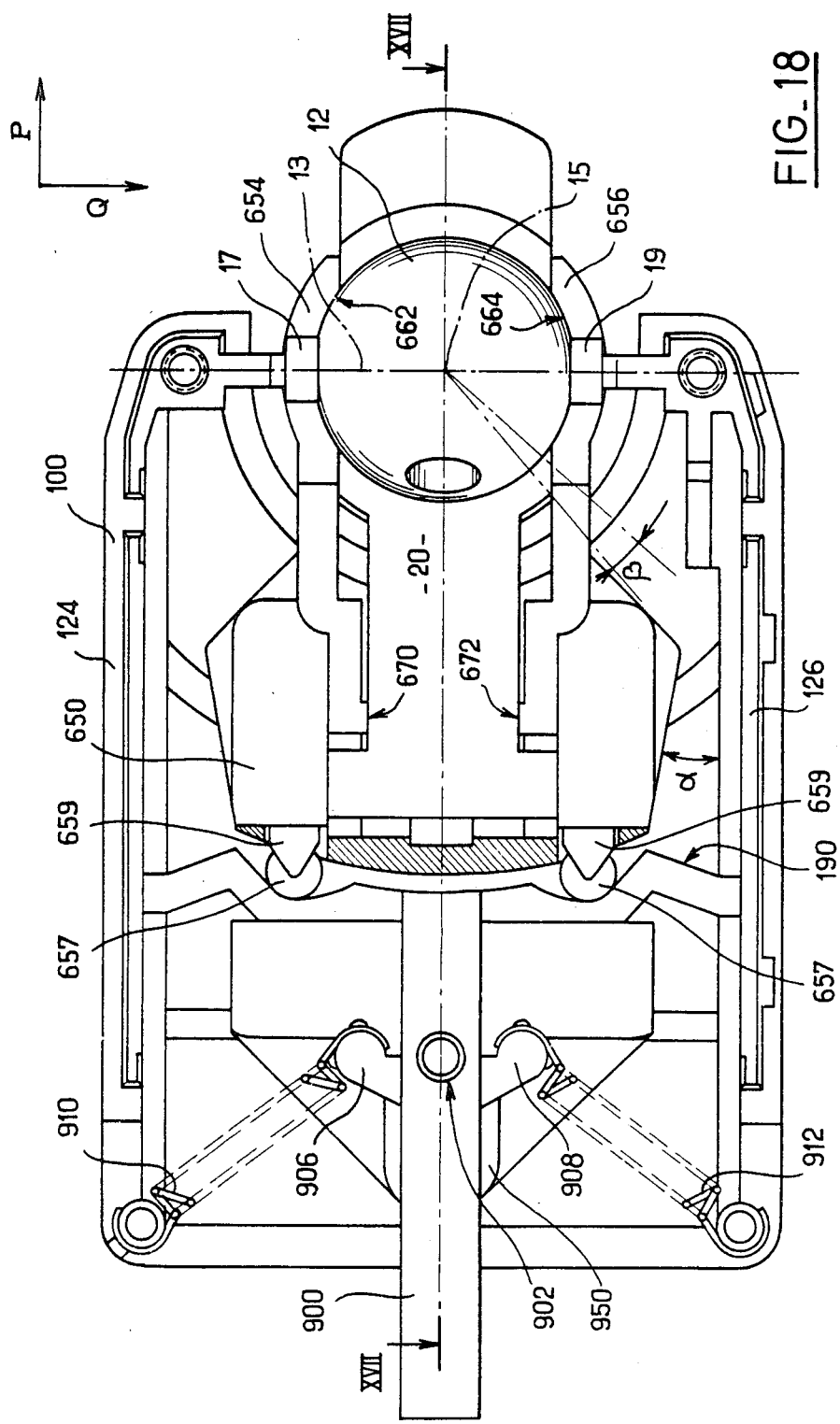
FIG. 18 is a view of the FIG. 17 switch on a section plane referenced XVIII—XVIII in FIG. 17.

The indexing surface 190 provided inside the housing 100 defines various concave depressions facing the pivot axis 15. These depressions define a rest position for the clevis 650 as can be seen in FIG. 18. They also define two stable working positions for the clevis 650 when displaced either clockwise or anti-clockwise about the axis 15, as shown in FIG. 18. These stable positions correspond to two different direction indicator positions for the motor vehicle.

In order to move away from these stable working positions and return to the rest position, as shown in FIG. 18, the driver may apply a force in the appropriate direction to the control lever 10 in order to return the indexing wheels 657 to the position shown in FIG. 18.

The clevis 650 may also be returned to its rest position as shown in FIG. 18 by means of a rocker bar 900 which is driven in conventional manner by rotation of the vehicle steering wheel.

In its rest position, the rocker bar 900 extends substantially parallel to the secondary axis P. It is provided on either side with two stub axles 902 and 904 which extend substantially parallel to the main axis O.

The rocker bar 900 has laterally extending hook structures 906 and 908. These hook structures co-operate with traction springs 910 and 912 which are connected at their opposite ends to the housing 100. The springs 910 and 012 exert forces on the rocker bar 900 having a resultant which is substantially parallel to the secondary axis P and directed away from the ball 12.

Figure 30:
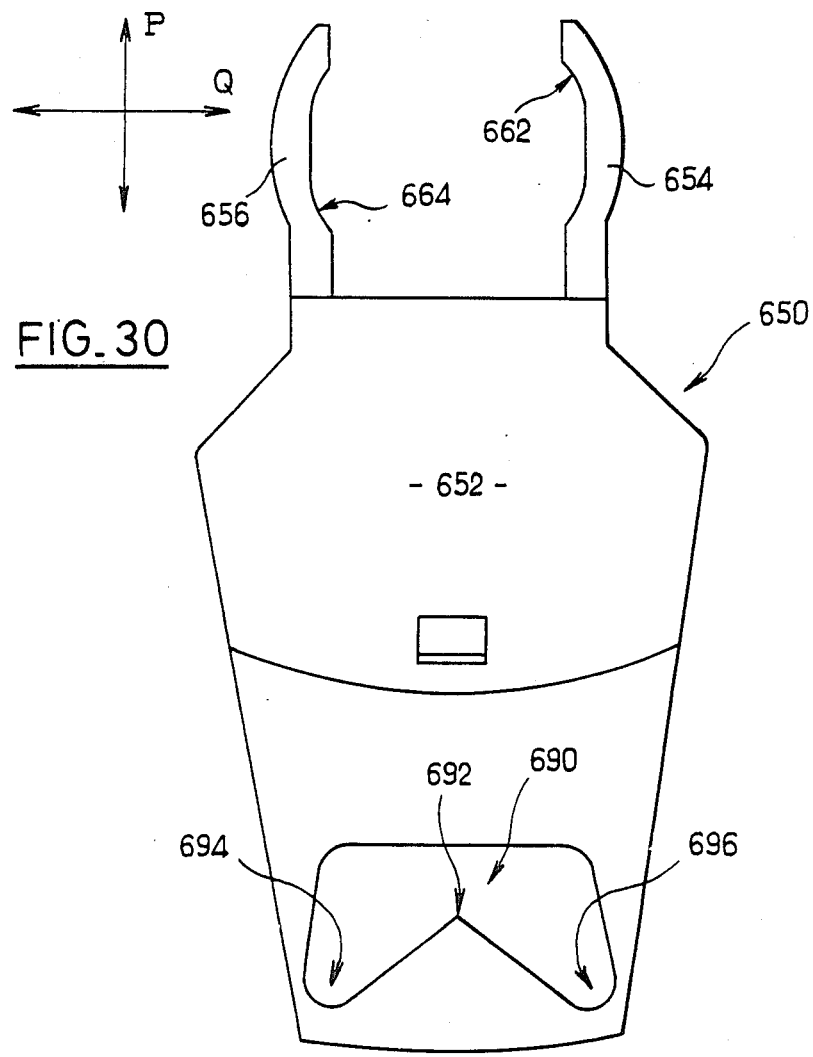
FIG. 30 is a plan view of the clevis used in the FIG. 17 switch seen along arrow XXX.
Figure 31:
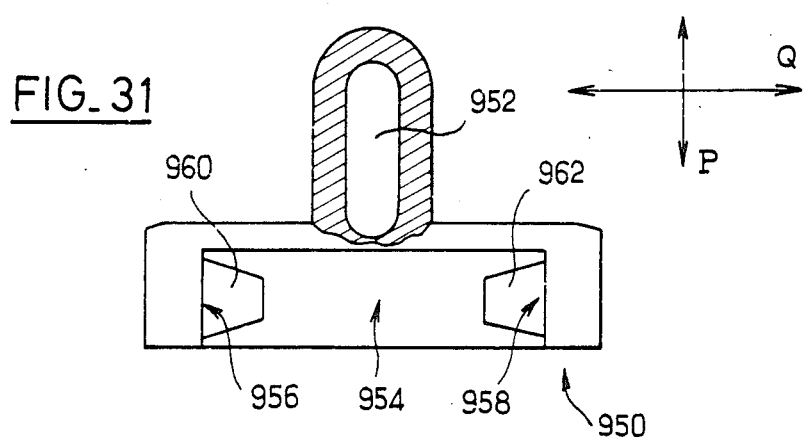
FIG. 31 is a view in partial section on a plane XXXI—XXXI of FIG. 17 through an override slide used in the FIG. 17 switch.

The bottom stub axle 209 on the rocker bar 900 is engaged in an opening 690 provided in the top face of the base 652 of the clevis 650, as can be seen in FIG. 30.

The opening 690 is at least partially delimited by a W-shaped edge having a central point 692 pointing towards the pivot axis 15 and two symmetrically disposed side recesses 694 and 696 likewise facing the axis 15.

The point 692 in the opening 690 is clsoer to the axis 15 than are the bottoms of the two side recesses 694 and 696.

The top stub axle 904 is engaged in an oblong opening 952 provided in a part 950.

In the normal operating position, the long direction of the oblong opening 952 extends parallel to the secondary axis P and coincides with the longitudinal plane of symmetry of the switch as referenced XVII—XVII in FIG. 18. It can be seen that the point 692 of the opening 690 provided in the clevis also coincides with this plane of symmetry XVII—XVII when the clevis is in its rest position as shown in the accompanying drawings.

When the clevis 650 is displaced by being pivoted about the axis 15, one of the recesses 694 or 696 in the opening 690 comes into a position beneath the opening 952. The bottom stub axle 902 therefore slides across the opening 690 to be received in the bottom of one of the recesses 694 or 696 while the top stub axle 904 slides along the oblong opening 952 away from the pivot axis 15. One or other of the direction indicators is switched on.

In conventional manner, the steering column connected to the motor vehicle steering wheel carries a structure which cooperates with the rocker bar 900.

This structure is such that when the steering wheel is rotated in a first direction the rocker bar 900 is pivoted about the axis of the stub axles 902 and 904 in order to bear against side abutments fixed on the outside of the opening 690 in order to return the clevis 650 to its rest position as shown in the accompanying drawings.

However, if the steering wheel is rotated in the opposite direction, the rocker bar 900 is free to pivot about the axis of the stub axles 902 and 904 without bearing against either of the above-mentioned abutments fixed to the clevis 650.

These conventional arrangements are not described in greater detail below.

However, it should be observed that the part 950 having the oblong opening 952 is free to move relative to the body of the housing 100. This arrangement is also conventional and well known to the person skilled in the art and serves to prevent the rocker bar 900 or a part connected thereto from being damaged when the driver holds the clevis 650 in a pivoted position about the axis 15 in order to keep the direction indicator lamps switched on in spite of the steering wheel being turned in such a direction as to tend to cause the rocker bar 900 to force the clevis 650 back to its rest position.

In the embodiment shown in the accompanying figures, the part 950 has a generally rectangular chamber 954.

This chamber has two side faces 956 and 958 facing each other and symmetrically disposed about the above-mentioned plane of symmetry XVII—XVII. These side faces have inwardly directed projections 960 and 962 thereon.

These projections 960 and 962 are frustoconical in shape and taper towards the plane of symmetry XVII- —XVII, and in addition they are axially chamfered. In other words, the envelope of the projections 960 and 962 is frustoconical in appearance, but extends round its axis of symmetry through an angle of 180°.

These projections 960 and 962 fixed to moving part 950 are, in use, pressed against symmetrical projections referenced 192 and 194 which are fixed to the top cover plate 106. Thus, the pairs of projections 962 and 192 and 960 and 194 co-operate to form frustoconical pegs.

A helical spring 198 extends substantially parallel to the auxiliary axis Q and is engaged at each end on respective ones of said pegs.

The person skilled in the art will readily understood that the spring 198 resiliently supports the part 950 on the cover plate 106 so as to allow the part 950 to move relative to the housing 100 and also so as to hold said part 950 against the cover plate 106.

This disposition is particularly advantageous for faciliting assembly of a switch in accordance with the invention.

MEANS FOR LOCKING THE CONTACT CARRIAGE AS ILLUSTRATED IN FIGS. 32 TO 37

These means comprise a contact carriage referenced 40 and a slide referenced 600.

The contact carriage 400 and the slide 600 are placed on respective sides of the web 120. The web 120 has an opening 121 whose shape is described in detail below.

The face 413 of the contact carriage 400 adjacent to the web 120 is provided with a locking member or peg 455. This member projects from the face 413 and passes through the opening 121 in order to co-operate with the slide 600.

The edge of the opening 121 facing the bottom cover plate 108 of the housing, i.e. the cover plate against which the contact carriage 400 rests by means of its contact stud 450, comprises three segments 170, 171, and 172. The contact carriage 400 bears successively against these segments 170, 171, and 172 by means of its locking member 455 as it is displaced from its rest position to its second position.

The first segment 170 extends substantially parallel to the auxiliary axis Q. The second segment 171 slopes away from the bottom cover plate 108 as it goes away from the first segment 170. Finally, the third segment 172 extends substantially parallel to the auxiliary axis Q.

The slide 600 has a blade 630 of ferromagnetic material for co-operating with a coil 700 fixed in the housing 100.

The slide 600 has a finger 648 against which the locking member 455 abuts when the contact carriage 400 is displaced into its second position. The finger 648 extends between the locking member 455 and the coil 700 in a direction which is substantially parallel to the direction of translation of the crosshead, i.e. parallel to the main axis O.

The slide 600 also has a locking member 650 suitable for co-operating with the locking member 455 fixed to the contact carriage 400.

The locking member 640 on the slide 600 comprises a surface 641 extending transversely to the auxiliary axis Q. This surface 641 projects from a surface 652 of the slide 600 which faces the bottom cover plate 108 of the housing, and it ends up at a surface 643 extending parallel to the direction of contact carriage displacement, i.e. orthogonal to the main axis O. The surface 643 faces the bottom cover plate 108 of the housing.

The surface 641 on the slide 600 faces towards the locking coil 700.

The locking member 455 provided on the contact carriage 400 is provided with a locking surface 456 for co-operating with the above-mentioned locking surface 641. The locking surface 456 extends transversely to the auxiliary axis Q. It faces away from the coil 700. Finally, it opens out to a surface 457 on the locking member 455 facing away from the bottom cover plate 108 and extending generally orthogonally to the main axis O.

The coil 700 is placed on a core of electromagnetic material 702 which extends parallel to the auxiliary axis Q and faces the slide 600.

Preferably, the blade 630 is capable of rocking on the slide 600 so that the blade 630 can be pressed closely against the end face 704 of the core 702 in order to reduce the air gap between the core 702 and the blade 630 as much as possible, as mentioned above with reference to FIGS. 9 to 11.

The operation of a switch including the means shown in FIGS. 32, 33, and 34 is now described with reference to FIGS. 35, 36, and 37.

In FIG. 35, the switch is shown in its rest position.

The control crosshead 200 is urged away from the contact 400 by its return springs 210 and 212. The tip 312 of the toggle bar 300 is at a distance from the contact carriage 400. The tip is facing the cam 460. The contact carriage 400 is urged by the spring 402 into its rest position. The contact stud 450 short-circuits two contact blades mounted on the housing and serving, advantageously, to power the dipped headlamp circuit of a motor vehicle.

The spring 424 associated with the contact stud 450 urges the surface 457 of the locking member 455 mounted on the contact carriage 400 against the first segment 470 of the opening 121 through the web 120.

At the same time, the slide 600 is at a distance from the coil 700. The blade 630 is thus at a distance from the core 702.

FIG. 36 shows the positions of the contact carriage 400 and of the slide 600 after the control crosshead 200 has been displaced to switch from dipped headlamps to full beam. The contact carriage 400 is displaced parallel to the auxiliary axis Q by virtue of the control crosshead 200 being displaced parallel to the main axis O causing the toggle bar 300 to slide along the cam 460 as described above.

It may be observed that as it moves from its rest position shown in FIG. 35 towards its second position shown in FIG. 36, the locking member 455 proivded on the contact carriage 400 comes into abutment against the control finger 648 on the slide 600. Also, during this displacement, the locking member 455 on the contact carriage 400 is urged by the spring 424 to slide over the second segment 171 of the opening 121 to reach the third segment 172 at the end of the displacement. As a result, the contact carriage 400 moves relative to the slide 600 parallel to the main axis O so as to bring the locking surfaces 456 and 641 of said parts into abutment. Although the slide 600 remains at a constant distance from the bottom cover plate 108 of the housing since it is sliding against a web 101 of the housing which extends parallel to the bottom cover plate 108, the contact carriage 400 as it moves from its rest position shown in FIG. 35 towards its second position shown in FIG. 36 is urged away from the bottom cover plate 108 of the housing by the spring 424. The amplitude of the movement of the contact carriage 400 away from the bottom cover plate 108 corresponds to the difference in level between the first and third segments 170 and 172 of the opening 121 relative to the bottom cover plate 108.

When the contact carriage 400 reaches its second position as shown in FIG. 36, the blade 630 on the carriage 600 is brought against the core 702 of the coil 700. It is recalled that as the contact carriage 400 moves towards the second position shown in FIGS. 36, the spring 424 associated with the stud 450 exerts a pivot couple on the carriage 400 which urges the locking member 455 against the third segment 172 of the opening 121. Similarly, the extension of the line passing through the pivot axis 302 and the center of the point of contact of the tip 312 of the toggle bar 300 on the cam 460 passes the axis of the wheel 414 on the side opposite to that occupied by the locking member 455. Thus, the toggle bar 300 also applies a pivoting couple to the contact carriage 400 acting in the same direction as the spring 424.

When the force exerted by the switch control lever is released, the spring 402 urges the locking surface 456 of the locking member 455 against the locking surface 641 of the slide 600.

In the second position of the contact carriage 400, as shown in FIG. 36, the contact stud 450 short-circuits a different pair of electrical contact blades. The electrical connection between this different pair of blades can be used to supply power to the motor vehicle main beam circuit.

If the electric coil 700 is unpowered when the lever controlling displacement of the crosshead 200 is released, the contact carriage 400 is returned to its rest position as shown in FIG. 35 by the spring 402. The slide 600 follows the contact carriage 400 and is returned to its rest position as shown in FIG. 35 by the locking member 455. To do this, the surface 643 of the slide 600 which meets the locking surface 641 comes level with the first segment 170 of the opening 121 when the slide is in its rest position. Further, when the slide is in its rest position as shown in FIG. 35, the locking surface 641 which extends transversely to the auxiliary axis Q coincides with the intersection between the first and second segments 170 and 172 of the opening 121.

In other words, if the coil 700 is not powered when the equipment is in the second position shown in FIG. 36, and the switch control level is released, the locking surface 456 of the contact carriage 400 remains in abutment against the locking surface 641 of the slide 600 until the locking member 455 reaches the first segment 170 of the opening 121. Thus, when the locking surface 456 escapes from the locking surface 641, the slide 600 is back in its rest position as shown in FIG. 35.

Consequently, if the coil 700 is not powered, the main beam position shown in FIG. 36 is an unstable position. In contrast, if the coil 600 is powered, the locking slide 600 is held in position and serves as an abutment for the contact carriage 400. The main beam position shown in FIG. 36 then becomes a stable position. Once the crosshead 200 has been returned to its rest position away from the contact carriage 400 by the return springs 210 and 212, the toggle bar 300 takes up a position facing the second cam 470.

The contact carriage 400 may be returned to its rest position as shown in FIG. 35 under remote control by opening the switch associated with the coil 700. As soon as the coil 700 is no longer powered, the slide 600 is no longer held in the locking position as shown in FIG. 36 and the spring 402 returns the contact carriage 400 together with the slide 600 to the rest position as shown in FIG. 35 by virtue of the locking surfaces 456 and 641 being engaged with each other.

The contact carriage may may also be returned to the first or rest position by moving the control crosshead 200 a second time towards the contact carriage 400. Whent he tip 312 of the toggle bar 300 comes into contact with the cam 470, the toggle bar 300 exerts a pivot couple on the contact carriage 40 in the opposite direction to that exerted by the spring 424. The pivoting couple exerted by the toggle bar 300 urges the locking member 455 away from the third segment 172 of the opening 121. i.e. towards the bottom cover plate 108 of the housing so that the locking surface 456 escapes from the locking surface 641 provided on the slide 600. Here again, the spring 402 in conjunction with the toggle bar 300 snaps the contact carriage 400 back into its rest position.

The dipped beam lighting circuit for the vehicle is switched back on by means of the contact stud 450.

However, the slide 600 remains in the locking position against the coil 700 as shown in FIG. 37.

When the control crosshead 200 is operated again, the contact carriage 400 is moved back along the auxiliary axis Q towards the coil 700. If the coil is still powered, then the slide 600 serves to lock the contact carriage 400. The contact carriage 400 and the slide 600 then occupy the stable position, shown in FIG. 36.

However, if the power to the coil 700 has been switched off before the contact carriage 400 is moved back towards the coil, the spring 402 returns the contact carriage 400 and the slide 600 by co-operation between the locking surfaces 456 and 641, as soon as the switch control lever is released.

In conclusion, the contact carriage 400 is held in the second position as shown in FIG. 36, corresponding to the vehicle headlamps being switched to main beam, solely when the slide 600 is held against the core 702 of the coil 700, i.e. when the coil 700 is powered.

As soon as the coil 700 is no longer powered, the second position of the contact carriage 400 as shown in FIG. 36 becomes an unstable position.

As a result, when the coil 700 is not powered, the contact carriage 400 is always returned to the rest position shown in FIG. 5 by the spring 402.

In contrast, when power is applied to the coil 700, successive displacements of the control crosshead 200 towards the contact carriage 400 serve to switch the contact carriage alternately between the two positions shown in FIGS. 36 and 37 in order to switch from dipped beam to main beam and back again.

It may be observed that the above-described arrangements ensure that when the contact carriage 400 is in the rest position as shown in FIG. 35 it is always in the same position relative to the bottom cover plate 108.

Similarly, when in the second position shown in FIG. 36, the contact carriage 400 is always at the same distance from the bottom cover plate 108.

As a result, the pressure exerted by the contact stud 450 on the contact blades associated therewith is always the same whenever the contact carriage 400 is in its rest position as shown in FIG. 35. Similarly, the pressure exerted by the contact stud 450 on the associated contact blades when the contact carriage 400 is in the second position as shown in FIG. 36 is always the same, even if it is not necessarily the same as the pressure exerted when in the rest position.

Naturally, the present invention is not limited to the particular embodiments described above, but extends to any variant thereof falling within the scope of the claims.

I claim:

1. A bistable switch, in particular a dipswitch for switching between a dipped and a main beam position for vehicle headlamps, the bistable switch comprising:
a housing containing:
a control crosshead guided in translation between a rest position and a working position;
a toggle bar extending in the direction of control crosshead displacement, and pivotally mounted on the control crosshead about an axis extending transversely to the direction of control crosshead translation, the toggle bar having a free end distant from the control crosshead;
a contact carriage guided in translation opposite said free end of the toggle bar, between a first position and a second position, in a direction generally perpendicular to the direction of control crosshead displacement and to the pivot axis of the toggle bar, said contact carriage including:
at least one contact stud; and
two sloping cam surfaces provided on a common face of the contact carriage facing the free end of the toggle bar, said cam surfaces alternately occupying a position facing said toggle bar depending on the position of the contact carriage in the housing so that when said control crosshead is displaced in the working position, the free end of the toggle bar contacts one or the other of the two sloping cam surfaces;
resilient means urging said contact carriage in the first position; and
means for selectively locking said contact carriage in the second position.

2. A bistable switch according to claim 1, wherein the contact carriage has an integral peg projecting therefrom perpendicularly to its direction of displacement, said peg engaging a slot provided in the housing, and said slot including at least one locking opening extending parallel to the direction of control crosshead displacement.

3. A bistable switch according to claim 2, further including an unlocking moving equipment which is guided in displacement in regard to said opening of the slot between a position in which it covers said opeing of said slot which extends parallel to the direction of control crosshead displacement, and a position in which it does not cover said opening.

4. A bistable switch according to claim 2, wherein a resilient member urges the peg integral with the contact carriage towards the locking opening of the slot provided in the housing.

5. A bistable switch according to claim 4, wherein the surface of the contact carriage furthest from the control crosshead is provided with the contact stud which bears against the housing and said resilient member also urges the contact stud away from the contact carriage into engagement with electrical contacts mounted on the housing.

6. A bistable switch according to claim 1, further including resilient means urging the toggle bar towards a rest position in which the toggle bar extends parallel to the direction of control crosshead displacement.

7. A bistable switch according to claim 1, further including resilient means urging the control crosshead towards a rest position at a distance from the contact carriage.

8. A bistable switch according to claim 1, wherein the surface of the contact carriage furthest from the control crosshead is provided with said contact stud and a wheel bearing against the housing.

9. A bistable switch according to claim 8, wherein the stroke of the contact carriage and the positions of the sloping cam surfaces on the contact carriage are such that depending on the position of the contact carriage in the housing, lines passing through the pivot axis of the toggle bar and the bottom of one or the other of the cam surfaces against which the free end of the toggle bar comes into contact pass respectively on either side of the contact between said wheel and the housing.

10. A bistable switch according to claim 1, wherein the housing includes a guide structure having a bearing surface which is not perpendicular to the direction of translation of the contact carriage, said bearing surface being contacted by the contact carriage when said contact carriage is displaced towards its first position.

11. A bistable switch according to claim 10, wherein said bearing surface is a generally cylindrical surface.

12. A bistable switch according to claim 11, wherein the cylindrical bearing surface of the guide structure is a cylinder of revolution about an axis extending transversely to the direction of contact carriage displacement.

13. A bistable switch according to claim 1, further including an electrically-conductive tab supported by the housing, an electrically-conductive blade supported by the control crosshead and by a spring inserted between the blade and the control crosshead, in such a manner that when the control crosshead is displaced towards its working position it presses said blade against said electrically-conductive tab with a constant force determined by said spring.

14. A bistable switch according to claim 13, wherein the blade moved by the control crosshead is used for flashing main beam headlamps when the crosshead is moved towards its working position.

15. A bistable switch according to claim 13, wherein the blade comprises a frame constituted by two risers and by two cross-members, the control crosshead including a finger which rests against the inside surface of one of the cross-members, and the spring being inserted between the finger and the other cross-member.

16. A bistable switch according to claim 15, wherein one of the cross-members carries an electrically-conductive tab.

17. A bistable switch according to claim 15, wherein one of the risers includes a projection which rests against a blade fixed to the housing, thereby defining a point of permanent electrical contact between the blade moved by the control crosshead and the fixed blade, and simultaneously defining a hinge point for the blade moved by the crosshead about said fixed blade.

18. A bistable switch according to claim 17, wherein the bearing zones between the blade moved by the crosshead and the fixed blade, and between the blade moved by the crosshead and the finger on the crosshead, are disposed on opposite sides of the axis of the spring associated therewith.

19. A bistable switch according to claim 1, wherein the surface of the contact carriage furthest from the control crosshead runs on a wheel mounted on the housing.

20. A bistable switch according to claim 1 wherein the selectively locking means comprise an electric coil selectively powered via an auxiliary switch, a slide displaceable by the contact carriage between a rest position corresponding to the first position of the contact carriage in which the slide is distant from the coil and a locking position corresponding to the second position of the carriage, in which the slide is close to the coil so that the slide is maintained in the locking position when the coil is powered and a pair of locking members respectively constituted by a peg extending perpendicularly to the direction of contact carriage displacement and a slot receiving said peg, the slot including at least one locking opening extending parallel to the direction of control crosshead displacement, with one of the locking members being provided on the contact carriage and with the other locking member being provided on the slide.

21. A bistable switch according to claim 20, wherein the locking means comprise a pair of locking members respectively constituted by a peg extending perpendicularly to the direction of contact carriage displacement and a slot receiving said peg, the slot including at least one locking segment extending parallel to the direction of crosshead displacement, with one of the locking members being provided on the contact carriage and with the other locking member being provided on the slide.

22. A bistable switch according to claim 20 wherein the peg is fixed to the contact carriage and the slot is provided in the slide.

23. A bistable switch according to claim 20, wherein the contact carriage and the slide are guided in parallel translation in the housing.

24. A bistable switch according to claim 20, wherein the slot has a main opening which extends generally in the direction of contact carriage displacement and a locking opening which extends perpendicularly to the direction of contact carriage displacement.

25. A bistable switch according to claim 24, wherein the locking opening is placed at one end of the main opening.

26. A bistable switch according to claim 1, wherein the selectively locking means comprise an electric coil selectively powered by an associated auxiliary switch, a slide carrying a first locking member co-operating with a second locking member provided on the contact carriage, the slide being displaceable by the carriage parallel to the displacement thereof between a rest position corresponding to the first position of the carriage in which the slide is distant from the coil and a locking position corresponding to the second position of the carriage in which the slide is close to the coil so that the slide is held in the locking position when the coil is powered, and a slope formed by the edge of an opening provided through a web in the housing controlling relative displacement of the contact carriage and the slide perpendicularly to the direction of contact carriage displacement when the contact carriage is displaced from the first position towards the second position in order to bring the locking members provided on the contact carriage and the slide into engagement.

27. A bistable switch according to claim 26, wherein the first locking member provided on the slide and the second locking member proivded on the contact carriage include locking surfaces orthogonal to the direction of carriage displacement.

28. A bistable switch according to claim 26, wherein one of the edges of the opening through the web in the housing comprises three segments: a first segment extending substantially parallel to the direction of contact carriage displacement; a second segment forming a slope and inclined relative to the direction of carriage displacement and sloping away from a cover plate against which the carriage is in abutment as it goes away from said first segment; and a third segment extending parallel to the direction of carriage displacement.

29. A bistable switch according to claim 28, wherein the first locking member, provided on the slide and the second locking member provided on the contact carriage include locking surfaces orthogonal to the direction of carriage displacement, and wherein the locking surface provided on the slide coincides, in the rest position, with the intersection of the first and second segments in the edge of the opening provided through the web in the housing.

30. A bistable switch according to claim 29, wherein the locking surface provided on the slide runs into a surface which is coplanar with the first segment.

31. A bistable switch according to claim 26, wherein the slide includes a control finger serving as an abutment for the contact carriage when the is displaced from its rest position towards its second position.

32. A bistable switch according to claim 26, wherein the selectively locking means comprise an electric coil selectively powered via an auxiliary switch associated with a slide carrying a locking member and displaceable by the contact carriage between a rest position corresponding to the first position of the carriage in which the slide is distant from the coil and a locking position corresponding to the second position of the carriage in which the slide is close to the coil, so that the slide is maintained in the locking position when the coil is powered, and wherein the slide has a blade of ferromagnetic material suitable for co-operating with the coil in order to hold the slide in the locking position while the coil is powered.

33. A bistable switch according to claim 32, wherein the blade is loosely supported on the slide so as to be able to press closely against a core provided in the coil.

34. A bistable switch according to claim 32, wherein the blade is U-shaped having two generally parallel branches interconnected by a transverse link and pivotally mounted on the slide by means of said link.

35. A bistable switch for switching between a dipped and main beam position for vehicle headlamps and controlling the vehicle direction indicator lights, the bistable switch comprising:
a housing containing:
a control crosshead guided in translation between a rest position and a working position;
a ball rotatably mounted in the housing about first and second orthogonal axes and a finger integral with said ball abutting said control crosshead so that rotation of the ball about the first axis causes the control crosshead to be displaced in its working position;
a toggle bar extending in the direction of control crosshead displacement, and pivotally mounted on the control crosshead about an axis extending transversely to the direction of control crosshead translation, the toggle bar having a free end distant from the control crosshead;

a contact carriage guided in translation opposite said free end of the toggle bar, between a first position and a second position, in a direction generally perpendicular to the direction of control crosshead displacement and to the pivot axis of the toggle bar, said contact carriage including:

at least one contact stud; and two sloping cam surfaces provided on a common face on the contact carriage facing the free end of the toggle bar, said cam surfaces alternately occupying a position facing said toggle bar depending on the position of the contact carriage in the housing so that when said control crosshead is displaced in the working position, the free end of the toggle bar contacts one or the other of the two sloping cam surfaces;

resilient means urging said contact carriage in the first position; and means for selectively locking said contact carriage in the second position;

a clevis linked to the ball when it rotates about said second axis, said clevis having a W-shaped aperture;

a moving part having an elongated slot and including a pair of projections in the form of one-half of a truncated cone;

an associated pair of projections in the form of one-half of a truncated cone, provided in the housing, said associated pair of projections being brought together with the pair of projections provided on the moving part to constitute two supports in the form of truncated cones;

a spring having its respective ends fitted over said truncated cones so as to restrict movement of the moving part in regard to the housing; and a rocker bar having two stub axles, said stub axles being received respectively in the elongated slot of the moving part and in the W-shaped aperture of the clevis.

* * * * *